United States Patent
Kamba et al.

(10) Patent No.: US 10,705,312 B2
(45) Date of Patent: Jul. 7, 2020

(54) FOCUS CONTROL APPARATUS, IMAGE CAPTURING APPARATUS, AND FOCUS CONTROL METHOD

(71) Applicant: CANON KABUSHIKI KAISHA, Tokyo (JP)

(72) Inventors: Masaki Kamba, Tokyo (JP); Ryo Kawasaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/885,291

(22) Filed: Jan. 31, 2018

(65) Prior Publication Data
US 2018/0217352 A1    Aug. 2, 2018

(30) Foreign Application Priority Data

Feb. 2, 2017    (JP) ................ 2017-017176
Mar. 28, 2017    (JP) ................ 2017-063733

(51) Int. Cl.
*G02B 7/09*     (2006.01)
*G03B 13/36*    (2006.01)
(Continued)

(52) U.S. Cl.
CPC ............... *G02B 7/09* (2013.01); *G02B 7/102* (2013.01); *G03B 13/36* (2013.01);
(Continued)

(58) Field of Classification Search
CPC .......... G02B 7/09; G02B 7/102; G03B 13/36; H04N 5/232123; H04N 5/23296; H04N 5/23245
(Continued)

(56) References Cited

U.S. PATENT DOCUMENTS

| 5,077,571 A | 12/1991 | Takayama et al. |
| 5,448,413 A | 9/1995 | Kobayashi et al. |

(Continued)

FOREIGN PATENT DOCUMENTS

| JP | 2012-128314 A | 7/2012 |
| JP | 2014-106324 A | 6/2014 |

OTHER PUBLICATIONS

European Partial Search Report dated Jun. 18, 2018, that issued in the corresponding European Patent Application No. 18154711.8.

(Continued)

*Primary Examiner* — Tuyen Tra
(74) *Attorney, Agent, or Firm* — Cowan, Liebowitz & Latman, P.C.

(57) ABSTRACT

A focus control apparatus includes a controller configured to provide a focus control that holds an object distance on which an image capturing optical system is focused that includes a magnification varying lens and a focus lens, and a calculator configured to calculate a defocus amount by using information on lens sensitivity that represents a relationship between a unit moving amount of the magnification varying lens and a moving amount of an image plane in the image capturing optical system, and information on error amounts of stop positions of the magnification varying lens and that of the focus lens. The controller moves the focus lens in a moving range limited based on the defocus amount.

29 Claims, 16 Drawing Sheets

(51) Int. Cl.
*H04N 5/232* (2006.01)
*G02B 7/10* (2006.01)

(52) U.S. Cl.
CPC ..... *H04N 5/23245* (2013.01); *H04N 5/23296* (2013.01); *H04N 5/232123* (2018.08)

(58) Field of Classification Search
USPC .................. 359/642, 811, 819, 822, 823
See application file for complete search history.

(56) References Cited

U.S. PATENT DOCUMENTS

| | | |
|---|---|---|
| 5,895,129 A | 4/1999 | Ohta |
| 2012/0050577 A1 | 3/2012 | Hongu |
| 2014/0267831 A1* | 9/2014 | Uchiyama .......... H04N 5/23209 348/231.6 |

OTHER PUBLICATIONS

European Search Report dated Nov. 22, 2018, that issued in the corresponding European Patent Application No. 18154711.8.

\* cited by examiner

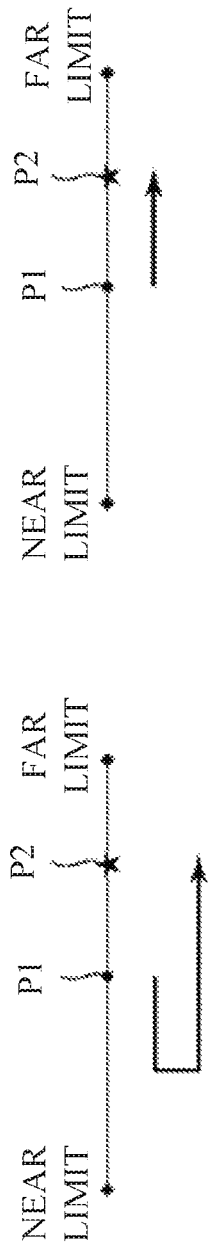
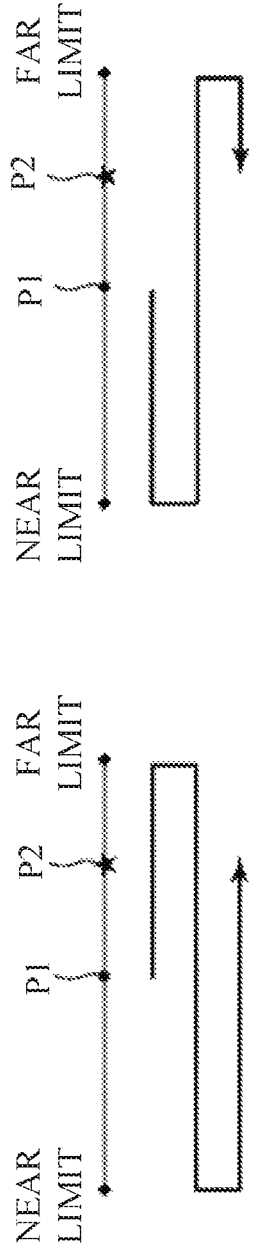
FIG. 17A
FIG. 17B
FIG. 17C
FIG. 17D

FOCUS CONTROL APPARATUS, IMAGE CAPTURING APPARATUS, AND FOCUS CONTROL METHOD

BACKGROUND OF THE INVENTION

Field of the Invention

The present invention relates to a focus control apparatus that controls an autofocus (AF) in an image capturing apparatus.

Description of the Related Art

One image capturing apparatus performs an AF control that controls a position of a focus lens in an image capturing apparatus focused on an object. Another image capturing apparatus includes a memory for storing electronic cam data that represents a position of a focus lens focused on each of a plurality of object distances for each zoom position in an image capturing optical system that can provide a zoom (magnification variation). This image capturing apparatus can continuously focus on an object at the same distance or fix a focus position even when the zoom position is changed, through zoom tracking that controls the focus lens position by utilizing the electronic cam data in zooming.

Even when the focus position is fixed, if the orientation of the image capturing apparatus changes or the image capturing apparatus vibrates, the focus lens position changes and the blur (defocus) occurs due to the mechanical backlash. The blur also occurs due to the thermal expansions and contractions of the image capturing apparatus or the image capturing apparatus.

In order to correct these blurs, it is necessary to correct the position of the focus lens according to an amount of the blur. However, the blur amounts caused by the mechanical backlash and the thermal change depend on the individual image capturing optical system and the individual image capturing apparatus, and the blur may not be well corrected even when the focus lens position is corrected with a uniform correction amount.

Japanese Patent Laid-Open No. ("JP") 2014-106324 discloses an image capturing apparatus that previously measures and stores a blur amount caused by an orientation difference between the starting time and the AF time in the image capturing apparatus, and controls a focus lens position so as to correct the blur amount according to the orientation detected in the actual AF. In addition, JP 2012-128314 discloses an image capturing apparatus that provides an AF control that corrects a blur caused by a thermal change detected by the temperature detector.

However, the image capturing apparatus disclosed in JP 2014-106324 needs a detector configured to detect the orientation of the image capturing apparatus. On the other hand, in the image capturing apparatus disclosed in JP 2012-128314, an object different from the original object may be focused (or the object replacement occurs) due to the AF control configured to correct the blur caused by the thermal change.

SUMMARY OF THE INVENTION

The present invention provides a focus control apparatus etc. which can properly correct a defocus caused by an orientation, a movement, a thermal change, etc. in an image capturing optical system (image capturing apparatus) with a simple configuration.

A focus control apparatus according to one aspect of the present invention includes a controller configured to provide a focus control that holds an object distance on which an image capturing optical system is focused that includes a magnification varying lens and a focus lens, and a calculator configured to calculate a defocus amount by using information on lens sensitivity that represents a relationship between a unit moving amount of the magnification varying lens and a moving amount of an image plane in the image capturing optical system, and information on error amounts of stop positions of the magnification varying lens and that of the focus lens The controller moves the focus lens in a moving range limited based on the defocus amount.

Further features of the present invention will become apparent from the following description of exemplary embodiments with reference to the attached drawings.

BRIEF DESCRIPTION OF THE DRAWINGS

FIGS. 17A to 17D compare an AF control when the focus lens is driven in a direction opposite to a correcting direction with an AF control when the focus lens is driven in the correcting direction according to a fifth embodiment.

DESCRIPTION OF THE EMBODIMENTS

Referring now to the accompanying drawings, a description will be given of embodiments of the present invention.

First Embodiment

Figure 1:
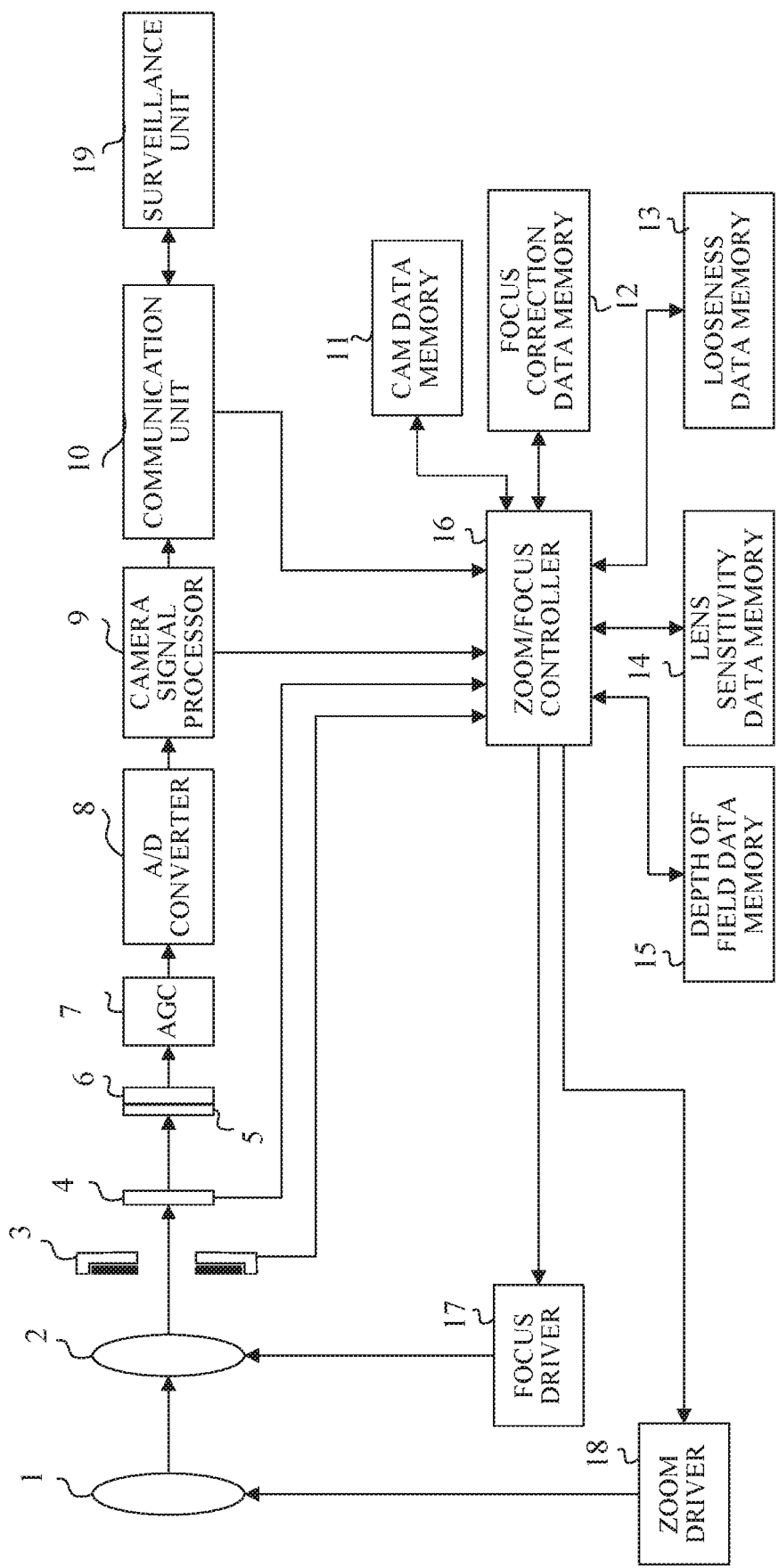
FIG. 1 is a block diagram of a configuration in an image capturing apparatus according to a first embodiment of the present invention.

FIG. 1 illustrates a configuration in an image capturing apparatus according to a first embodiment of the present invention. The image capturing apparatus includes an image capturing optical system in an unillustrated lens barrel. The image capturing optical system includes a plurality of optical elements, and forms an optical image of an object. The image capturing apparatus according to this embodiment is a lens integrated type image capturing apparatus integrated with the image capturing optical system (lens barrel), but may be a lens interchangeable type image capturing apparatus in which the image capturing optical system is interchangeable. This is applicable to other embodiments, which will be described later.

The image capturing optical system includes a magnification varying lens 1 that moves in an optical axis direction and changes a focal length, a focus lens 2 that moves in the optical axis direction for focusing, and a diaphragm unit 3 that adjusts a light quantity. The light that passes the image capturing optical system forms an object image as an optical image on an image sensor 6 via a band-pass filter (referred to as a "BPF" hereinafter) 4 and a color filter 5. The BPF 4 can be inserted into and ejected from the optical path in the image capturing optical system. The object image is photo-electrically converted by the image sensor 6.

An analog electric signal (image capturing signal) output from the image sensor 6 is gain-controlled by an AGC 7, converted into a digital signal by an A/D converter 8, and then input into a camera signal processor 9. The camera signal processor 9 generates an image signal through various image processing for a digital image signal. The image signal is output to a surveillance monitor unit 19 connected to an image capturing apparatus through a wired or wireless communication via a communication unit 10, and output to a zoom/focus controller 16 in the image capturing apparatus. The zoom/focus controller 16 performs a zoom tracking control with data of an electronic cam curve, which will be described later, in zooming, and an autofocus (AF) control with a contrast evaluation value representing a contrast state of the image signal calculated from the image signal. The zoom/focus controller 16 corresponds to a focus control apparatus that includes a controller and a calculator.

Figure 2:
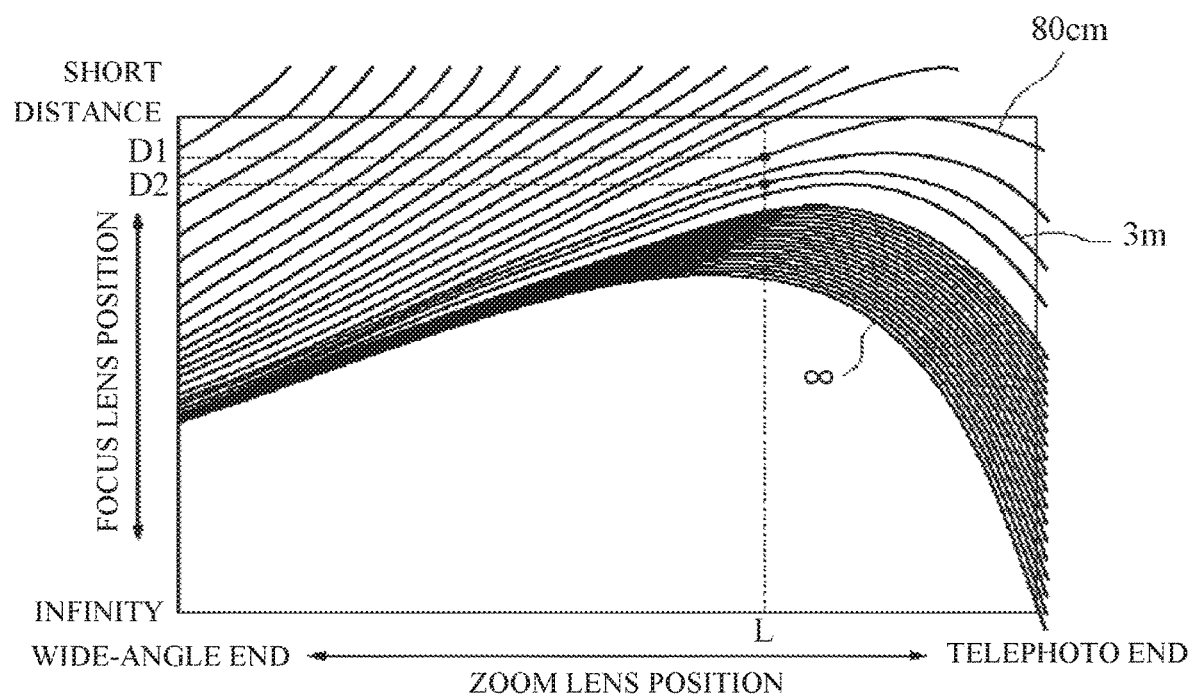
FIG. 2 illustrates a zoom tracking curve according to the first embodiment.

Referring to FIG. 2, a description will be given of a zoom tracking control. FIG. 2 illustrates a relationship between a position (abscissa axis) of the magnification varying lens 1 from a telephoto end to a wide-angle end and a position of the focus lens 2 (ordinate axis) focused on each object distance from infinity (far) to the short distance (near) end. Each curve representing the relationship will be referred to as an electronic cam curve or a zoom tracking curve (referred to as an "electronic curve" hereinafter). In the zoom tracking control, in zooming that moves the magnification varying lens 1 while a certain object distance is focused on, the focus lens 2 is moved to a position corresponding to the certain object distance along the electronic cam curve. In other words, the focus lens 2 is moved so as to reduce (correct) a movement of an image plane (focus plane) as the magnification varying lens 1 moves. Thereby, the zooming is performed while an in-focus object distance is maintained which is an object distance with which an in-focus state is obtained or the focus position is fixed.

A cam data memory 11 as a storage unit stores data (referred to as "electronic cam data" hereinafter) of the electronic cam curve for each object distance in a table data format. The electronic cam data stored in the cam data memory 11 is data corresponding to a plurality of representative object distances (referred to as "specific object distances" hereinafter), as illustrated in FIG. 2. Hence, the position of the focus lens 2 at another object distance other than the specific object distances is calculated by interpolation processing with the electronic cam data corresponding to two specific object distances between the short distance side and the infinity side close to the other object distance.

The cam data memory 11 receives information on the position of the magnification varying lens 1 (referred to as a "zoom position" hereinafter) and the position of the focus lens 2 (referred to as a "focus position" hereinafter) from the zoom/focus controller 16. In addition, the electronic cam data corresponding to the zoom position and the focus position (or the in-focus object distance at the zoom position) is selected or calculated through the interpolation processing based on the table data.

A focus fixing data memory 12 stores mode information on the activation/deactivation of the focus position fixing mode that is a mode for fixing a focus position as the in-focus object distance and the mode selected in the focus position fixing mode. The focus fixing data memory 12 also stores focus position information representing a focus position to be fixed. The focus position fixing mode contains two modes, such as an infinity focus fixing mode that fixes a focus position at infinity, and registered position focus fixing mode that fixes a focus position to a registered focus position (object distance) arbitrarily selected or registered by a user from infinity to the short distance end. The mode information and focus position information are written in the focus fixing data memory 12 via the communication unit 10 and the zoom/focus controller 16 through a communication from the surveillance monitor unit 19 operated by a user (observer).

Figure 3:
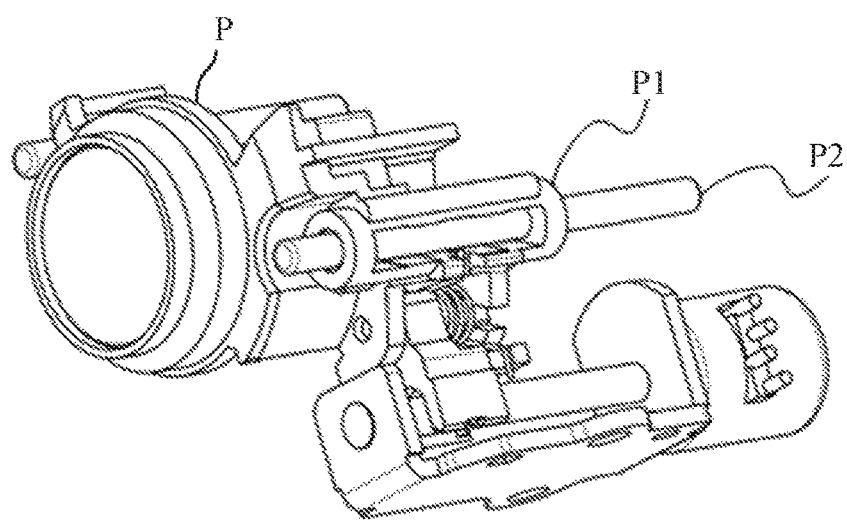
FIG. 3 illustrates a configuration of a lens barrel according to the first embodiment.

A backlash data memory 13 stores information on a maximum amount of backlash in the lens barrel or a maximum backlash amount in the lens barrel. FIG. 3 illustrates an example of the internal configuration of the lens barrel. A lens holder frame (lens holder) P that holds the magnification varying lens 1 and the focus lens 2 has a sleeve P1. A hole formed at both ends of the sleeve P1 is engaged with a guide bar P2 as a guide member and thus the lens holder frame P is movably guided in the optical axis direction along the guide bar P2. A difference (engagement gap amount) of several micrometers exists between an internal diameter of a hole in the sleeve P1 and an outer diameter of the guide bar P2 so that the lens holding frame can smoothly move. As the orientation of the image capturing apparatus changes, the lens is driven, etc., a maximum tilt amount (angle) of the lens held by the lens holding frame P can be calculated based on the engagement gap amount and the distance between both ends of the sleeve P1.

This embodiment calculates a maximum position shift amount at the lens center (optical axis position) based on the maximum tilt amount, and sets the maximum position shift amount to the maximum backlash amount. This embodiment regards a necessary gap between the hole in the sleeve P1 and the guide bar P2 as the "backlash" and attributes the stop position errors (referred to as "lens stop position errors" hereinafter) of the magnification varying lens 1 and the focus lens 2 to the backlash, a manufacturing error of a component for driving each lens, and a driving control error of each lens. The "maximum backlash amount in the lens barrel" in this embodiment is a total value of the maximum backlash amount of each of the magnification varying lens 1 and the focus lens 2, or the maximum value of the stop position error amount of each of the magnification varying lens 1 and the focus lens 2.

Similar to the cam data memory 11, the lens sensitivity data memory 14 receives information on the zoom position and the focus position from the zoom/focus controller 16, and calculates the lens sensitivity corresponding to the zoom position and the focus position (object distance). The lens sensitivity in this embodiment represents a relationship (such as a ratio) between a unit moving amount of the magnification varying lens 1 and a moving amount of the image plane (focus plane) in the image capturing optical system, and varies based on the zoom position and the focus position.

The lens sensitivity data stored in the lens sensitivity data memory 14 is also only data corresponding to the focus positions (referred to as a "specific focus position" hereinafter) that provides in-focus states at the plurality of specific object distances. The lens sensitivity data memory 14 selects as the lens sensitivity for another focus position other than the specific focus position, a larger one of lens sensitivities corresponding to two specific focus positions on the short distance side and the infinity side close to the other focus position.

Figure 4:
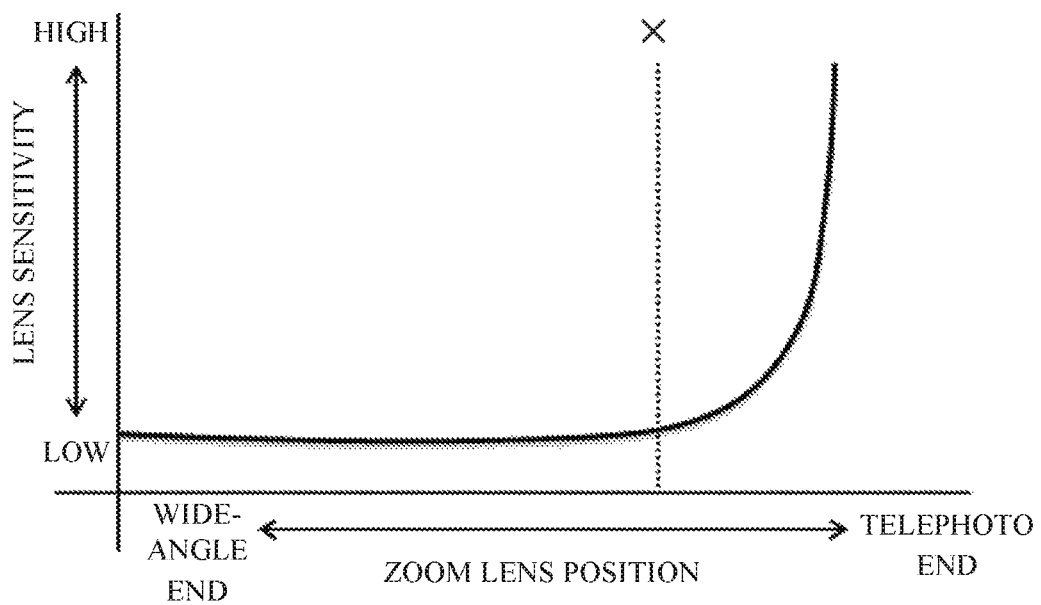
FIG. 4 illustrates a relationship between a zoom position and a focus sensitivity according to the first embodiment.
Figure 5:
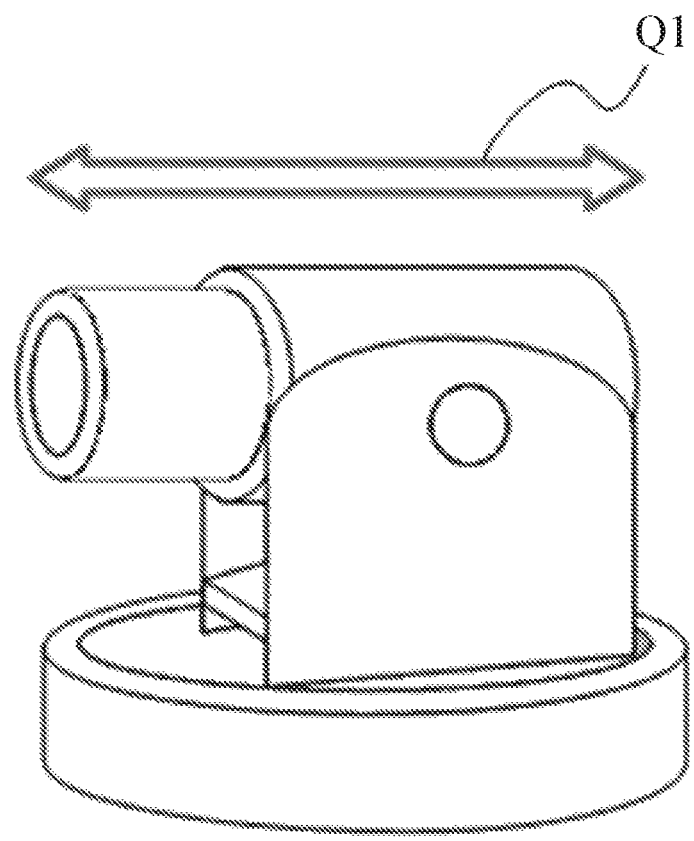
FIG. 5 illustrates an external appearance of the image capturing apparatus according to the first embodiment.

FIG. 4 illustrates a lens sensitivity example of the image capturing optical system with a 20 to 30 power zoom magnification. The lens sensitivity becomes abruptly high when the zoom position exceeds the X position. In order to reduce the lens sensitivity, it is necessary to extend an overall length Q1 of the image capturing apparatus that includes the lens barrel, as illustrated in FIG. 5. Hence, a large lens sensitivity is necessary for the miniaturization and the high zoom magnification of the image capturing apparatus.

The zoom/focus controller 16 obtains information (data) of the maximum backlash amount from the backlash data memory 13, and obtains information (data) of the lens sensitivity corresponding to the zoom position and the focus position from the lens sensitivity data memory 14. Then, a defocus amount is calculated with the following expression (1).

$$\text{DEFOCUS AMOUNT} = \text{LENS SENSITIVITY } (z+h, f) \times (\text{MAXIMUM BACKLASH AMOUNT OF LENS BARREL}) \quad (1)$$

The lens sensitivity (z+h) is calculated based on the zoom position to which the hysteresis is added in a direction in which the lens sensitivity becomes higher. While the expression (1) calculates the defocus amount with the maximum backlash amount of the lens barrel, it is unnecessary to always use the maximum backlash amount and a backlash amount that has been properly set based on the maximum backlash amount may be used.

A depth-of-field data memory 15 stores data of the depth of field for each zoom position with the open aperture and infinity object distance as data of the reference depth of field. The depth of field is an object distance range in which an in-focus state is apparently obtained around the focus position as a center. The depth-of-field data memory 15 obtains information of the zoom position and information of the F-number of the diaphragm unit 3 from the zoom/focus controller 16. In addition, data of the depth of field corresponding to the zoom position and the F-number is calculated based on the reference depth of field at the obtained zoom position and the obtained F-number and the following expression (2).

$$\text{DEPTH OF FIELD } (z, F) = \text{REFERENCE DEPTH OF FIELD } (z) \times F\text{-NUMBER} \quad (2)$$

While this embodiment calculates and stores data of the depth of field when the object distance is fixed to infinity, data of the depth of field may be stored as the table data, similar to the cam data memory 11.

The zoom/focus controller 16 compares the defocus amount calculated with the expression (1) with the depth of field calculated with the expression (2) when the mode information on the focus fixing data memory 12 is changed by the communication from the surveillance monitor unit 19 with the user. When the defocus amount is larger than the depth of field, the zoom/focus controller 16 performs the AF control that obtains the in-focus state by driving the focus lens 2 by the focus driver 17 in a range of ±the defocus amount or a moving range limited by the defocus amount.

Figure 6:
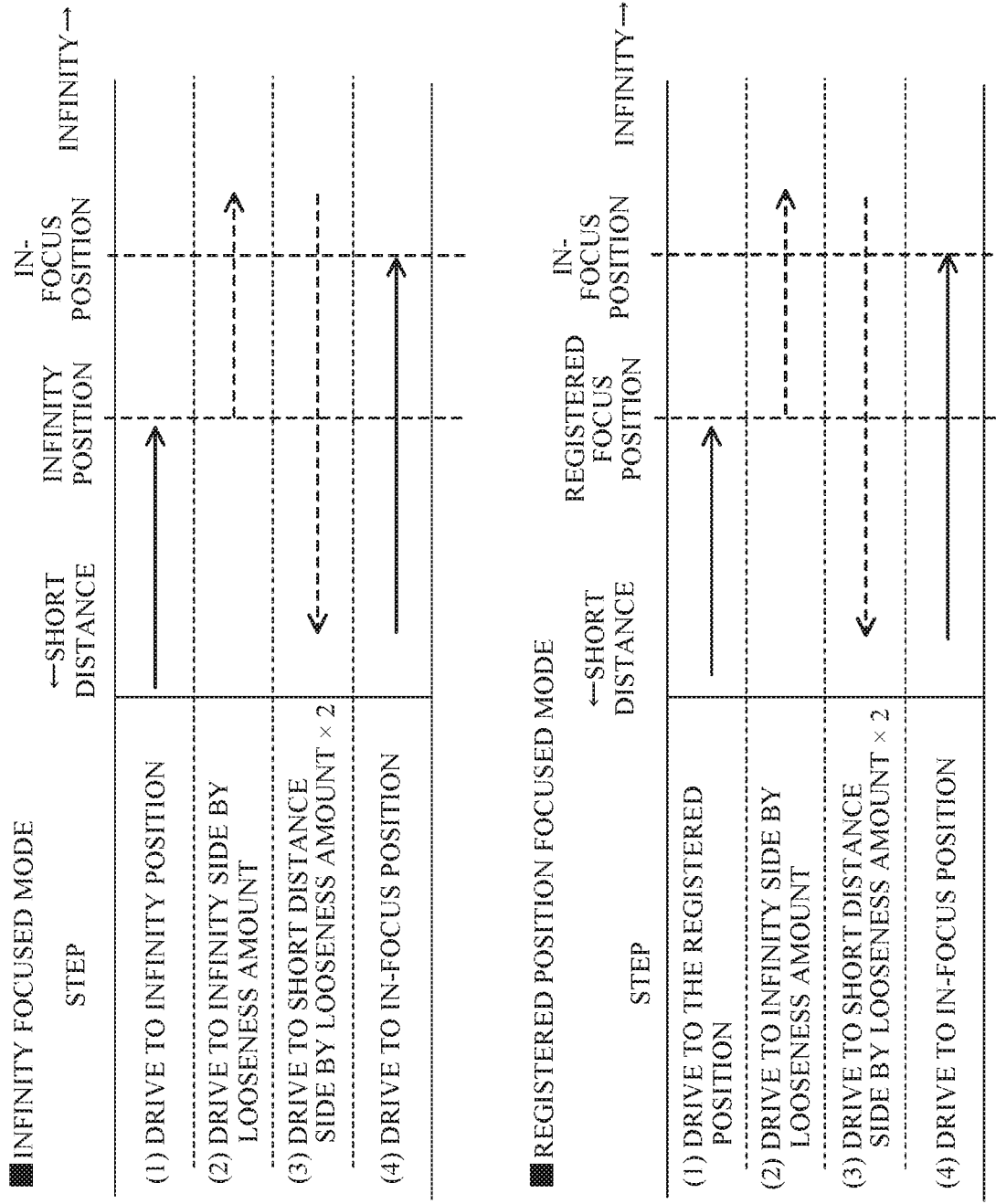
FIG. 6 illustrates a focus control process in a focus position fixing mode according to the first embodiment.

FIG. 6 illustrates an AF control example for the zoom/focus controller 16 to store an in-focus object distance in the image capturing optical system in the focus position fixing mode. In each of the infinity focus fixing mode and the registered position focus fixing mode, the AF control is performed by four steps. In the step 1, the zoom/focus controller 16 drives the focus lens 2 to the focus position (referred to as a "registered focus position" hereinafter) corresponding to the infinity position or the registered focus position in the step 1. Next, in the step 2, the zoom/focus controller 16 drives the focus lens 2 by a driving amount corresponding to the maximum backlash amount so as to search for the in-focus position on the infinity side from the infinity position or the registered focus position. The in-focus position to be searched for is a maximum or peak position of the contrast evaluation value.

Next, in the step 3, the zoom/focus controller 16 drives the focus lens 2 by a driving amount corresponding to the maximum backlash amount×2, so as to search for the in-focus position from the position of the focus lens 2 driven in the step 2 to the short distance side. In the last step 4, the zoom/focus controller 16 drives the focus lens 2 to the in-focus position detected by the search.

Figure 7:
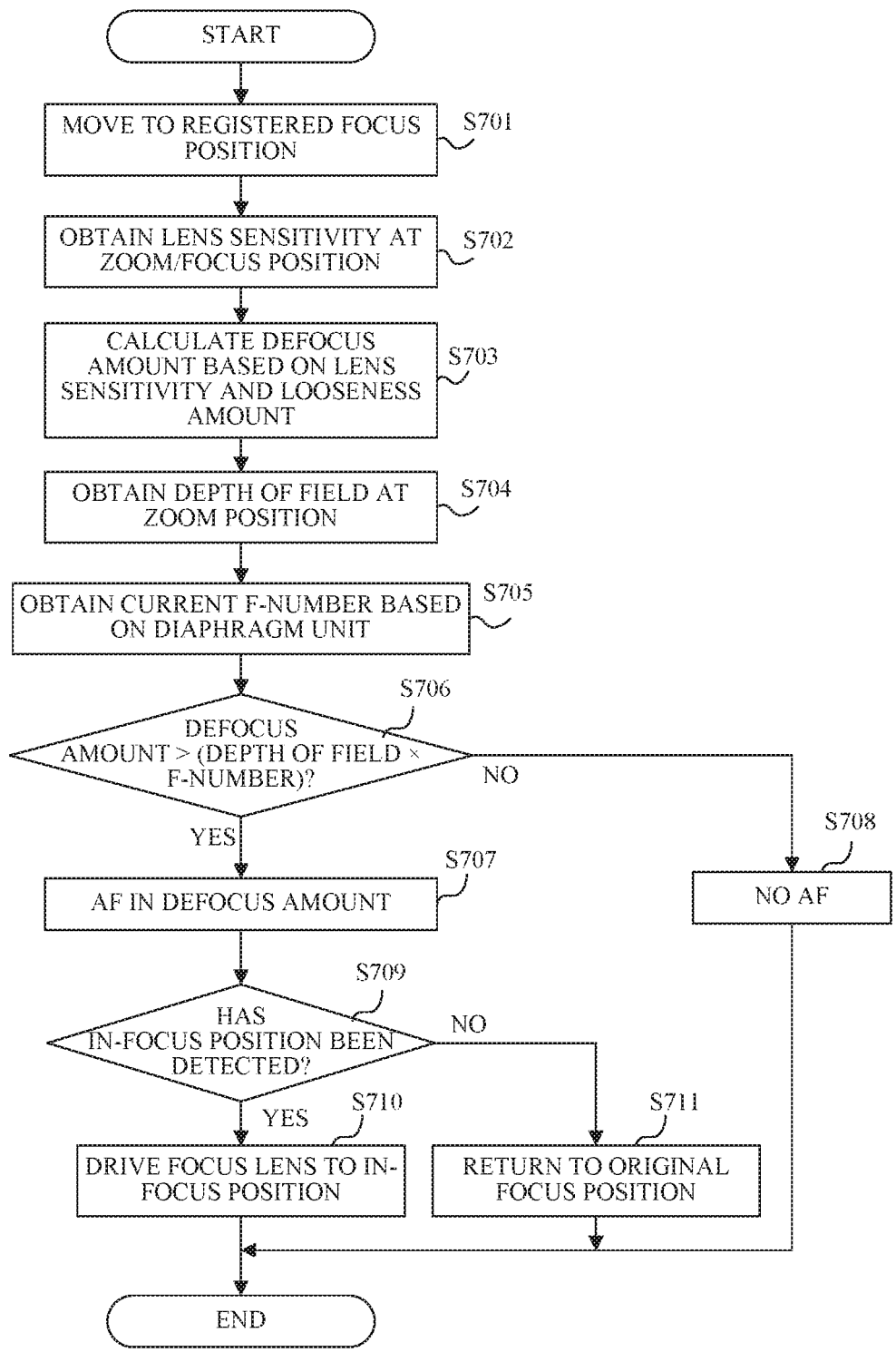
FIG. 7 is a flowchart for a focus control process according to the first embodiment.

A flowchart in FIG. 7 illustrates a flow of an AF control process (focus control method) performed by the zoom/focus controller 16 in the registered position focus fixing mode. The zoom/focus controller 16 as the computer executes this process in accordance with the focus control program as a computer program. The zoom/focus controller 16 starts this process when the mode information in the focus fixing data memory 12 is changed to the registered position focus fixing mode by the communication from the surveillance monitor unit 19 or when the image capturing apparatus starts or restarted in the registered position focus fixing mode.

In the step S701, the zoom/focus controller 16 obtains the registered focus position from the focus fixing data memory 12, and instructs the focus driver 17 to move the focus lens 2 to the registered focus position. When moving the focus lens 2 to the registered focus position is completed, the zoom/focus controller 16 obtains information of the lens sensitivity corresponding to the current zoom position and focus position from the lens sensitivity data memory 14 in the step S702. As described above, the lens sensitivity data memory 14 sends a larger one of the lens sensitivities corresponding to the two specific focus positions close to the other focus position other than the specific focus positions to the zoom/focus controller 16.

Next, in the step S703, the zoom/focus controller 16 obtains information of the maximum backlash amount from the backlash data memory 13 and calculates a defocus amount using the expression (1). In the steps S704 and S705, the zoom/focus controller 16 obtains the depth of field corresponding to the current zoom position and open aperture from the depth-of-field data memory 15, and obtains the current F-number from the diaphragm unit 3.

In the next step S706, the zoom/focus controller 16 calculates the depth of field at the current zoom position and focus position using the expression (2). Then, the zoom/focus controller 16 determines whether the defocus amount calculated in the step S703 exceeds the depth of field. When the defocus amount exceeds the depth of field, the zoom/focus controller 16 proceeds to the step S707, and performs the AF control that drives the focus lens 2 in a range of the registered focus position±the defocus amount. Then, the flow moves to the step S709. On the other hand, when the defocus amount does not exceed the depth of field, the zoom/focus controller 16 proceeds the step S708, and ends this process without the AF control.

In the step S709, the zoom/focus controller 16 determines whether the AF control has detected the in-focus position. If the AF control has detected the in-focus position, the zoom/focus controller 16 drives the focus lens 2 to the in-focus position through the focus driver 17 in the step S710, and ends this process. On the other hand, when the AF control has not detected the in-focus position, the zoom/focus controller 16 proceeds to the step S711, drives the focus lens 2 to the registered focus position as the original position through the focus driver 17, and ends this process.

This embodiment can restrain the object replacement and properly correct the defocus without a detector configured to detect an orientation of the image capturing apparatus, even when the defocus amount is not uniform and the defocus is caused by the lens stop position error.

The AF control that holds the in-focus object distance in the image capturing optical system may be performed when the zoom tracking control is performed or completed. The AF control may be performed when the zoom/focus fixing mode is set which the user fixes the zoom magnification (zoom position) and the object distance (focus position) to the arbitrarily registered zoom magnification and object distance. The defocus amount, as described herein, depends on the type of the connected lens when the lens barrel is an interchangeable lens, because the lens sensitivity and the maximum backlash amount vary due to the lens type. The zoom/focus controller 16 can calculate the defocus amount based on the lens type by using the information on the lens type. By an example, the zoom/focus controller 16 obtains information (data) of the maximum backlash amount or a backlash amount based on the maximum backlash amount for each lens type from the backlash data memory 13, and calculates the defocus amount. In another example, the zoom/focus controller 16 obtains information (data) of the maximum backlash amount or a backlash amount based on the maximum backlash amount of the lens from the lens apparatus, and calculates the defocus amount.

Second Embodiment

Figure 8:
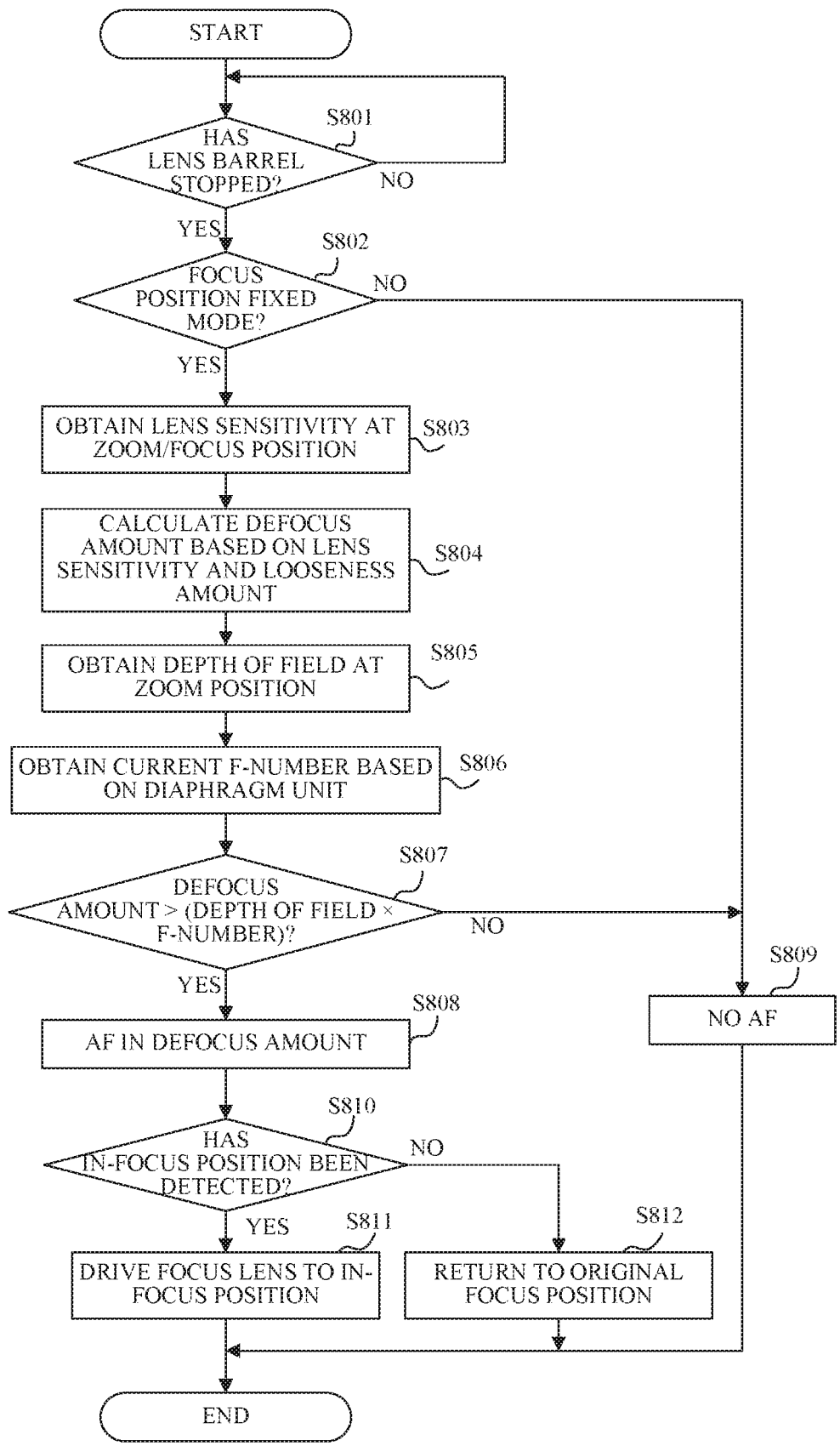
FIG. 8 is a flowchart for a focus control process according to a second embodiment of the present invention.

A flowchart in FIG. 8 illustrates a flow of an AF control processing performed by the zoom/focus controller 16 in the image capturing apparatus according to a second embodiment of the present invention. This embodiment discusses the AF control process when the lens barrel moves in the image capturing apparatus in the focus position fixing mode. The movement of the lens barrel contains the movement affecting the lens stop position error, such as panning, tilting, and zooming. The configuration of the image capturing apparatus according to this embodiment is similar to that of the image capturing apparatus according to the first embodiment, and corresponding components in the first embodiment will be designated by the same reference numerals.

The movement of the lens barrel starts or stops when the user sends a start/stop command of panning, tilting, or zooming to the zoom/focus controller 16 via the communication unit 10 from the surveillance monitor unit 19. The zoom/focus controller 16 starts the AF control when the panning, tilting, or zooming is stopped.

In the step S801 in FIG. 8, the zoom/focus controller 16 determines whether the lens barrel stops. When it is not stopped or panning, tilting, or zooming is performed, the zoom/focus controller 16 again determines the step S801 in the next timing (such as the vertical synchronizing timing). On the other hand, when the lens barrel stops, the zoom/focus controller 16 proceeds to the step S802, and obtains the activation/deactivation state of the focus position fixing mode from the focus fixing data memory 12. In the non-focus position fixing mode, the flow moves to the step S809 so as to end this process without the AF control. On the other hand, in case of the focus position fixing mode, the zoom/focus controller 16 performs the step S803 to the step S812. The process from the step S803 to the step S812 is the same as the process from the step S702 to S711 in FIG. 7.

This embodiment can restrain the object replacement and properly correct the defocus, even when the defocus amount is not uniform and the defocus occurs as the lens barrel moves.

Third Embodiment

Figure 9:
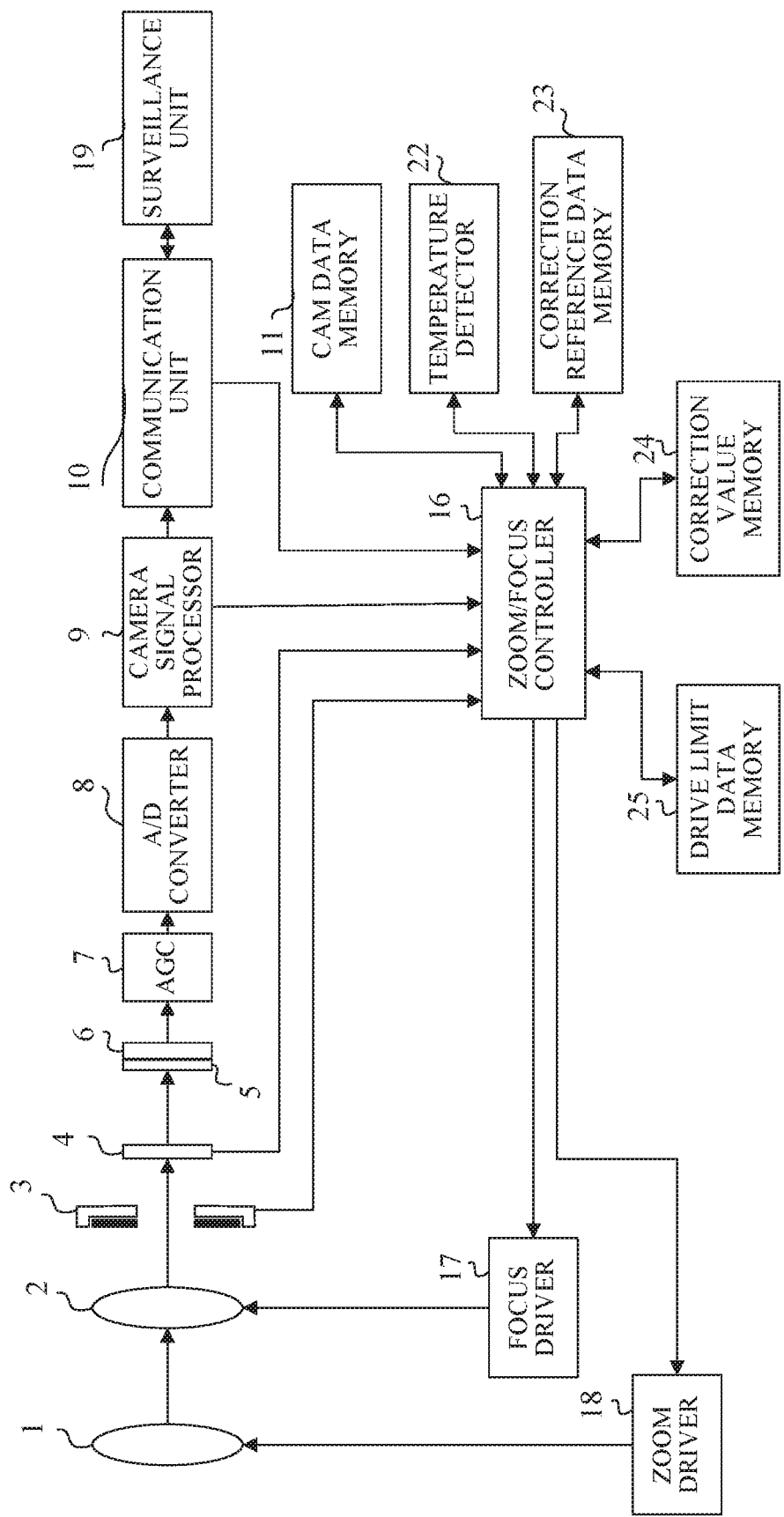
FIG. 9 is a block diagram of a configuration in an image capturing apparatus according to a third embodiment of the present invention.

FIG. 9 illustrates a configuration in an image capturing apparatus according to a third embodiment according to the present invention. This embodiment discusses an AF control that corrects the defocus caused by the temperature. Those elements in the image capturing apparatus according to this embodiment, which are corresponding elements in the image capturing apparatus according to the first embodiment, will be designated by the same reference numerals.

Similar to the first embodiment, the image capturing optical system includes the magnification varying lens 1 that moves in the optical axis direction and changes a focal length, the focus lens 2 that moves in the optical axis direction for focusing, and the diaphragm unit 3 that adjusts a light quantity. The light that has passed the image capturing optical system forms an object image as an optical image on an image sensor 6 via the band-pass filter (referred to as a "BPF" hereinafter) 4 and the color filter 5. The BPF 4 can be inserted into and ejected from the optical path in the image capturing optical system. The object image is photo-electrically converted by the image sensor 6. An analog electric signal (image capturing signal) output from the image sensor 6 is gain-controlled by the AGC 7, converted into a digital signal by the A/D converter 8, and then input into the camera signal processor 9. The camera signal processor 9 generates an image signal through various image processing for a digital image signal. The image signal is output to the surveillance monitor unit 19 connected to the image capturing apparatus through a wired or wireless communication via the communication unit 10, and output to the zoom/focus controller 16 in the image capturing apparatus. The zoom/focus controller 16 performs a zoom tracking control with data of an electronic cam curve, which will be described later, in zooming, and an autofocus (AF) control with a contrast evaluation value representing a contrast state of an image signal calculated from the image signal. The zoom/focus controller 16 corresponds to a focus control apparatus that includes a controller.

A temperature detector 22 as a thermometer detects the temperature of the lens barrel (image capturing optical system) in the image capturing apparatus. The zoom/focus controller 16 obtains information of the temperature through the temperature detector 22 for each predetermined time period, and monitors a change of the temperature. The temperature detector 22 uses a temperature sensor, such as a thermistor.

A correction reference data memory 23 stores a reference focus correction amount as a focus correction amount per unit temperature calculated from statistical data of a designed value and an actually measured value of the lens barrel. When the reference focus correction amount is multiplied by a thermal change amount from the reference temperature, such as an assembly temperature in the factory, a thermal focus correction amount is calculated as a focus correction amount for the actual temperature. A range of the direction and amount of the thermal focus correction as a focus correction in accordance with the temperature of the lens barrel can be limited even when the individual lens barrel performance scatters. Hence, the thermal focus correction using the average data can reduce the defocus caused by the thermal change (referred to as a "thermal defocus" hereinafter).

The correction reference data memory 23 stores the data of the reference focus correction amount for each of a plurality of specific object distances and each zoom position, similar to the electronic cam data described in the first embodiment. The reference focus correction amount with another object distance other than the specific object distance is calculated through interpolation processing with the reference focus correction amount corresponding to two specific object distances on the short distance and infinity sides close to the other object distance.

Thus, in the lens barrel in which the thermal defocus caused by the individual scattering falls within a range of the permissible circle of confusion, the thermal defocus can be sufficiently restrained only by this basic thermal focus correction (first thermal focus correction referred to as a "basic thermal focus correction" hereinafter). On the other hand, in the lens barrel in which the thermal defocus caused by the individual scattering does not fall within a range of the permissible circle of confusion, the thermal defocus is corrected by a correction of a thermal defocus caused by individual scattering (a second thermal focus correction referred to as an "individual thermal focus correction" hereinafter) in addition to the basic thermal focus correction.

Figure 10:
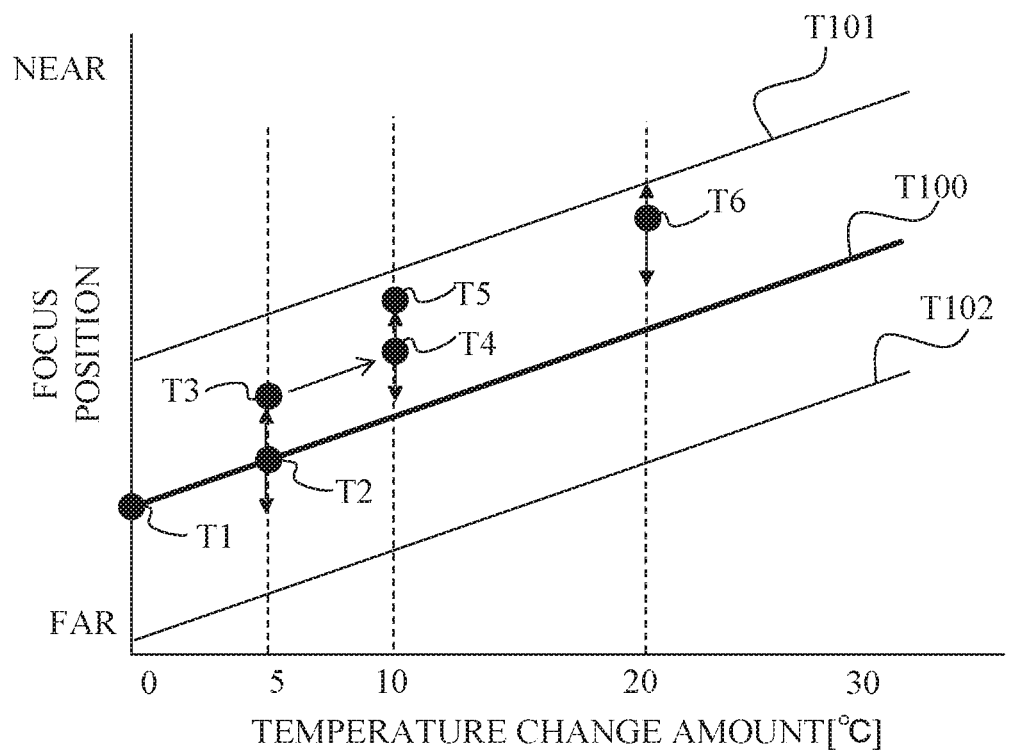
FIG. 10 illustrates a thermal focus correction process according to the third embodiment.

FIG. 10 illustrates an individual thermal focus correction example in addition to the basic thermal focus correction performed by the zoom/focus controller 16. For the individual thermal focus correction, an AF control is performed that limits a search range as a moving range of the focus lens 2 whenever a predetermined thermal change is detected in the lens barrel. In FIG. 10, the abscissa axis denotes a thermal change amount (° C.) and the ordinate axis denotes a focus position.

T100 represents a basic thermal focus correction amount that is a focus correction amount in a basic thermal focus correction. The basic thermal focus correction amount increases with the thermal change, and the focus position changes after the basic thermal focus correction is performed. T1 corresponds to a focus position fixed by the user, and the temperature at this time is set to the reference temperature.

T2 is a focus position after the basic thermal focus correction is performed when the temperature changes by 5° C. as a predetermined thermal change amount. Vertical arrows from T2 represent a search range in the AF control for the individual thermal focus correction around T2 as a center. By setting the predetermined thermal change amount to be small, such as 5° C., the search range for one search can be narrowed and the object replacement can be restrained. This embodiment discusses the predetermined thermal change amount fixed to 5° C., but the predetermined thermal change amount may be variable according to a slope (change rate) of the thermal change.

This is because there is a difference of the extension and contraction of the lens between when the temperature drastically changes and when the temperature moderately changes, and the difference level is different according to lenses. Assume that when the weather does not change, an hourly thermal change amount is about 1° C. in one region. Then, when the weather abruptly changes, the thermal change amount abruptly changes in that region. Accordingly, the accurate correction can be made, for example, by storing the thermal change amount per 30 minutes, and by performing the AF control for the individual thermal focus correction if the temperature changes by 3° C. in this period.

In addition, the predetermined thermal change amount may be changed according to the lens type and the magnification variation. More specifically, for the lens type and magnification variation with a small defocus amount per unit temperature, the predetermined thermal change amount is made larger. For the lens type and magnification variation with a large defocus amount per unit temperature, the predetermined thermal change amount is made smaller. This configuration can optimize the number of individual thermal focus corrections.

The search range may be changed according to the slope of the electronic cam data, the tilt angle of the lens barrel (slope angle), and the accumulated driving number of a lens. The electronic cam data represents the positional relationship between the zoom lens and the focus lens, and is one factor usable to estimate the influential degree when the lens is extended or retracted.

As illustrated in FIG. 2, the slope of the curve depends on the zoom position and the object distance. As the slope of the curve is larger, the in-focus position is significantly changes with a little positional change, and a residual correction amount may be smaller as the search range is enlarged. When the slope of the curve is small, the correction is available even with a narrow search range. The tilt angle of the lens barrel is subject to the change of the heat persistence and the gravity since orientations of the lens and the barrel change. An optimal correction is available by storing the search range for each tilt angle as a data table in accordance with the design of the lens barrel. The accumulated lens driving number is counted up whenever the lens is driven, and provides a total moving amount of the lens. Depending on the design and the material of the lens barrel, a shift amount of the lens may increase due to accumulated loads and deteriorations over time. In this lens type, whenever the accumulated lens driving number exceeds the predetermined number, the search range is expanded for accurate corrections. T3 is a focus position when the in-focus state is obtained by the AF control in the search range around T2 as a center. Herein, in addition to the basic thermal focus correction, a focus position after the individual thermal focus correction is made on the short distance (near) side is illustrated. T4 represents a focus position after the basic thermal focus correction is made when the focus position is moved to T3 and then the temperature further changes by 5° C. (or by 10° C. from the reference temperature). Vertical arrows from T4 represent a search range in the AF control for the individual thermal focus correction around T4 as a center. T5 represents a focus position when the in-focus state is obtained by the AF control in the search range around T4 as a center. The search range when the temperature changes by 10° C. from the reference temperature becomes closer to the near side than the search range when the temperature changes by 5° C. from the reference temperature.

A correction value accumulator 24 accumulates a basic thermal focus correction amount from T1 to T2, a correction amount of the individual thermal focus correction from T2 to T3 (referred to as a "correction amount of the individual thermal focus correction" hereinafter), the basic thermal focus correction amount from T3 to T4, and the individual thermal focus correction amount from T4 to T5. The following description refers to the accumulated values of the basic and individual thermal focus correction amounts as accumulated correction amounts.

A driving limit data memory 25 stores upper and lower limit values of the individual thermal focus correction amount as data of a driving limit amount (moving limit position). The driving limit amount is used to prevent the object replacement even when a target area for the in-focus state (AF area) set in the image capturing range shifts from the object as the original in-focus target. In FIG. 10, T101 represents the upper limit of the individual thermal focus correction amount, and T102 represents its lower limit.

T6 represents a focus position near the upper limit value T101 of the individual thermal focus correction amount when the temperature changes by 20° C. from the reference temperature. For the AF control that limits the search range from T6, the search range on the near side is limited by T101. In other words, the search range when the temperature changes by 20° C. from the reference temperature is closer to the near side than the search range when the temperature changes by 10° C. from the reference temperature. The search range on the near side when the temperature changes by 20° C. from the reference temperature is narrower than the search range on the near side when the temperature changes by 10° C. from the reference temperature. The driving limit amount may be variable according to at least one of the zoom position and the in-focus object distance. This is because the object is more likely to replace with a longer object distance. For example, when the search range is limited by a maximum depth of 15 cm on the basis of the object of 4 m ahead, the search range is limited by a maximum depth of 40 m on the basis of the object of 100 m ahead. Hence, the accurate correction is available by storing the limit that depends on the zoom position and the object distance in the table.

Thus, this embodiment performs an AF control that moves the focus lens 2 in a search range limited by a thermal change amount from the reference temperature. This configuration can restrain the object replacement and properly correct the defocus caused by the thermal change.

The accumulated correction value in the correction value accumulator 24 is reset when the AF control is performed and panning/tilting is performed by the user operation.

The AF control that has a limited search range by the zoom/focus controller 16 may not be performed. A first case is that the F-number corresponds to a small aperture larger than the predetermined F-number, and the defocus caused by the individual scattering occurs only in the depth of field. A second case that the gain of the image sensor is higher than the predetermined level, the image capturing signal has many noises, and the AF accuracy is low. A third case is that a contrast evaluation value used for the AF control is lower than the predetermined evaluation value when the low contrast object is captured or when an obstacle passes in front of the image capturing apparatus.

In addition, when a still object is monitored for a long time, the temperature in the previous AF control is stored and the AF control may be again performed when a predetermined thermal change from the temperature is detected.

Figure 11:
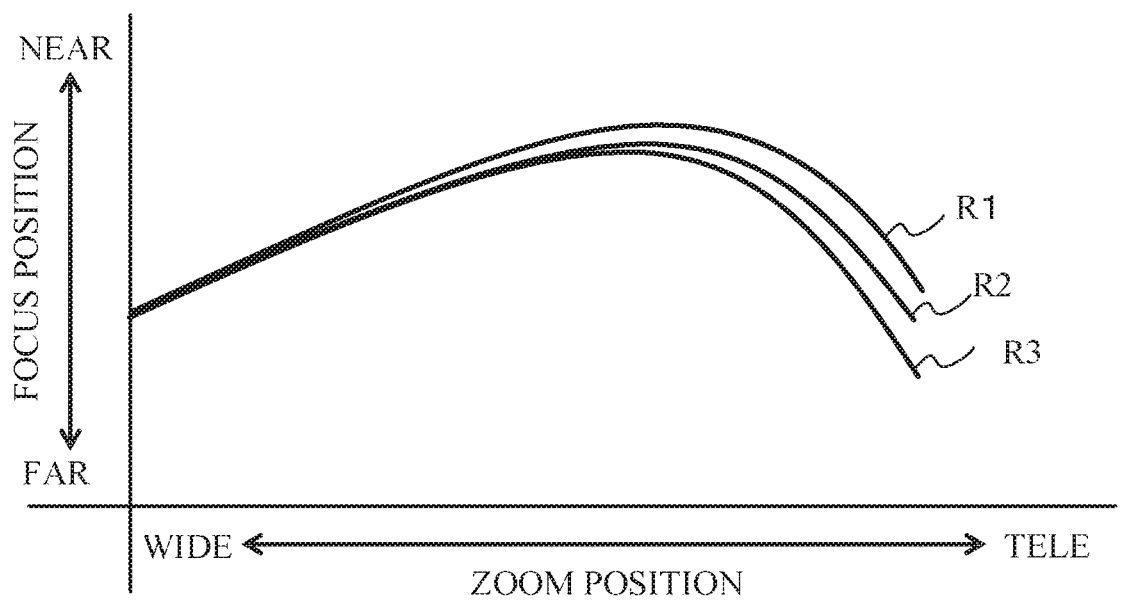
FIG. 11 illustrates a correction example of a zoom tracking curve used in the thermal focus correction according to the third embodiment.

Referring now to FIG. 11, a description will be given of a relationship among the basic reference focus correction, the individual thermal focus correction, and the electronic cam curve (electronic cam data). The abscissa axis denotes a zoom position, and the ordinate axis denotes a focus position. R1 represents the electronic cam data (referred to as "reference cam data" hereinafter) corresponding to one certain object distance in a plurality of electronic cam data stored as designed value data for each object distance. R2 represents electronic cam data (referred to as "basic temperature correction cam data" hereinafter) generated by adding the basic thermal focus correction to the reference cam data R1. The basic thermal focus correction amount depends on the zoom position and the object distance, but is generally large on the telephoto side and small on the wide-angle side. R3 represents electronic cam data (referred to as "individual temperature correction cam data" hereinafter) generated by adding the individual thermal focus correction to the basic temperature correction cam data R2.

The correction value accumulator 24 stores the individual thermal focus correction amount when the individual thermal focus correction is performed by the AF control that limits the search range for each object distance at each zoom position other than the telephoto end, as data of the telephoto converted correction amount as a correction amount on the telephoto end. The individual thermal focus correction amount depending on the actual zoom position is calculated based on the stored telephoto end converted correction amount. The individual thermal focus correction amount depending on the zoom position can be calculated by multiplying the telephoto end converted correction amount by a ratio of a thermal focus correction amount between the telephoto end and the actual zoom position.

As understood from the electronic cam data illustrated in FIG. 2, focus positions with object distances other than the short distance side are converged on one position around the wide-angle end. Thus, when the zoom magnification is smaller than the predetermined zoom magnification L between the telephoto end and the wide-angle end, only the basic thermal focus correction may be performed without the individual thermal focus correction. Thereby, while the basic and individual thermal focus corrections are performed, the accurate zoom tracking control is available.

Figure 12:
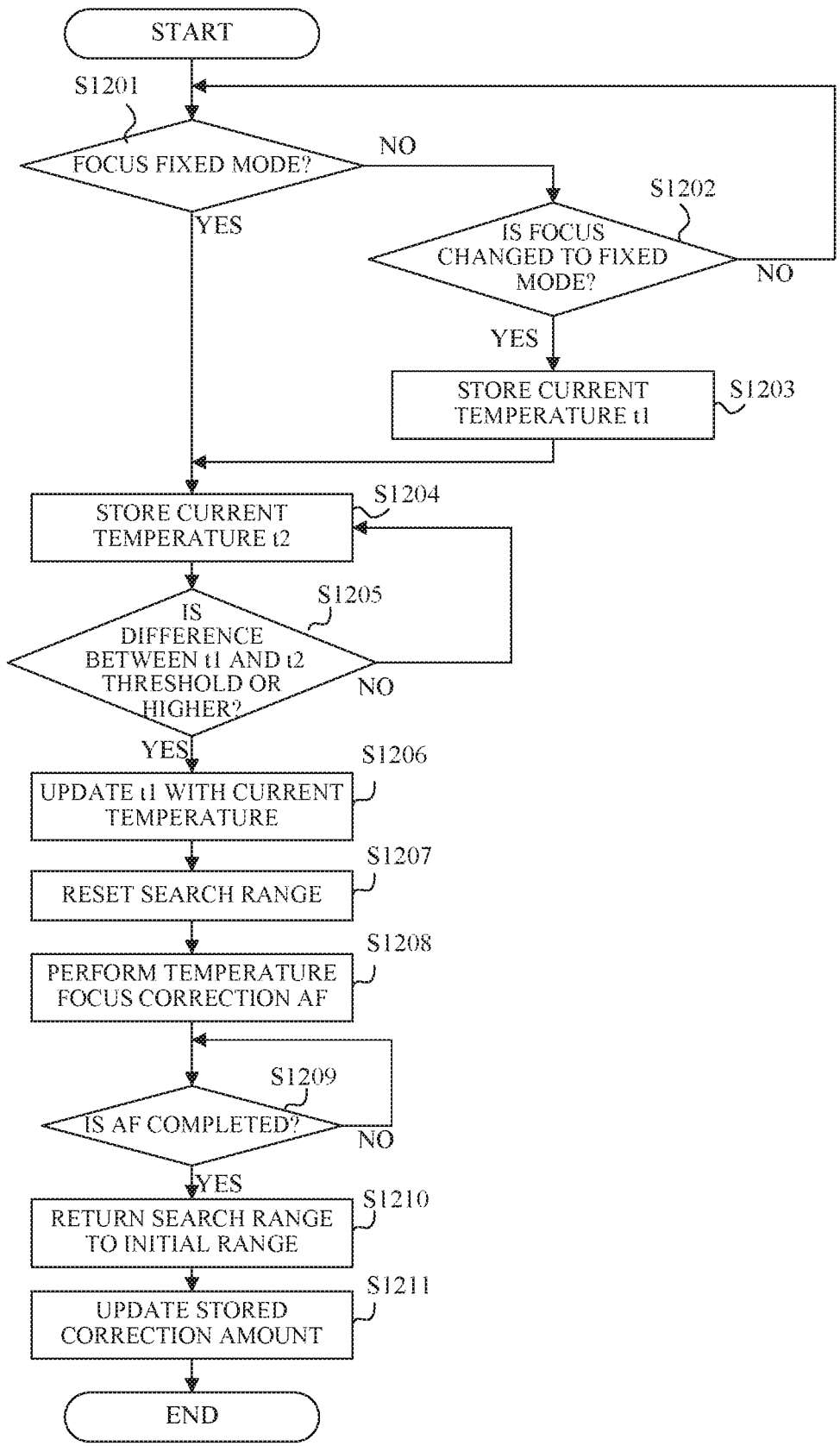
FIG. 12 is a flowchart of a focus control process according to the third embodiment.

A flowchart in FIG. 12 represents a flow of an AF control process (focus control method) performed by the zoom/focus controller 16 in the focus position fixing mode described in the first embodiment. The zoom/focus controller 16 as the computer executes this process in accordance with the focus control program as a computer program.

In the step S1201, the zoom/focus controller 16 determines whether the focus position fixing mode is set. When the focus position fixing mode is set, the zoom/focus controller 16 proceeds to the step S1204. On the other hand, unless the focus position fixing mode is set, the zoom/focus controller 16 proceeds to the step S1202, and returns to the step S1201 through the surveillance monitor unit 19 until the user instructs setting of the focus position fixing mode. In the step S1202, when setting of the focus position fixing mode is instructed, the zoom/focus controller 16 sets the focus position fixing mode, and obtains the current temperature t1 from the temperature detector 22 in the step S1203. Then, the flow moves to the step S1204. When the focus fixing mode at the start time, t1 is initialized with temperature when the image capturing apparatus is started.

In the step S1204, the zoom/focus controller 16 obtains the current temperature t2 from the temperature detector 22. In the step S1205, the zoom/focus controller 16 determines whether the thermal change amount that is a difference between the temperature t1 obtained in the step S1203 and the temperature t2 obtained in the step S1204 is equal to or larger than the predetermined temperature. The predetermined temperature is, for example, 5° C. When the temperature change amount is smaller than the predetermined temperature, the zoom/focus controller 16 returns to the step S1204 and continues to obtain the temperature t2 until the thermal change amount is equal to or larger than the predetermined temperature. On the other hand, when the thermal change amount is equal to or larger than the predetermined temperature, the zoom/focus controller 16 proceeds to the step S1206, again obtains the current temperature from the temperature detector 22, and updates the temperature t1 with the temperature. In the step S1207, the zoom/focus controller 16 limits the search range in accordance with the temperature change amount. At this time, the zoom/focus controller 16 obtains the accumulated correction amount from the correction value accumulator 24, and obtains the driving limit amount from the driving limit data memory 25. The zoom/focus controller 16 resets (narrows) the search range that limits the drive amount to the driving limit amount when the drive amount made by adding the initial value in the search range to the accumulated correction value exceeds the driving limit amount.

Next, in the step S1208, the zoom/focus controller 16 executes the AF control for the individual thermal focus correction in the search range set in the step S1207. Then, in the step S1209, the zoom/focus controller 16 determines whether the AF control is completed. When the AF control is completed, the flow moves to the step S1210.

In the step S1210, the zoom/focus controller 16 returns to the search range to the initial value. Next, in the step S1211, the zoom/focus controller 16 sends the correction amount of the focus position caused by the AF control to the correction value accumulator 24. The correction value accumulator 24 updates the accumulated correction amount by adding the correction amount to the accumulated correction amount. Then, the zoom/focus controller 16 ends this process.

This embodiment can restrain the object replacement and properly correct the defocus, even when the defocus occurs as the temperature changes in the lens barrel and the defocus is not uniform.

This embodiment discusses the AF control for the thermal focus correction different from the zoom tracking control. However, as described with reference to FIG. 11, the individual temperature correction cam data made by correcting the electronic cam data in accordance with the temperature may be generated, and the zoom tracking control may be performed which moves the focus lens through the basic and individual thermal focus corrections by using the individual temperature correction cam data.

Fourth Embodiment

Figure 13:
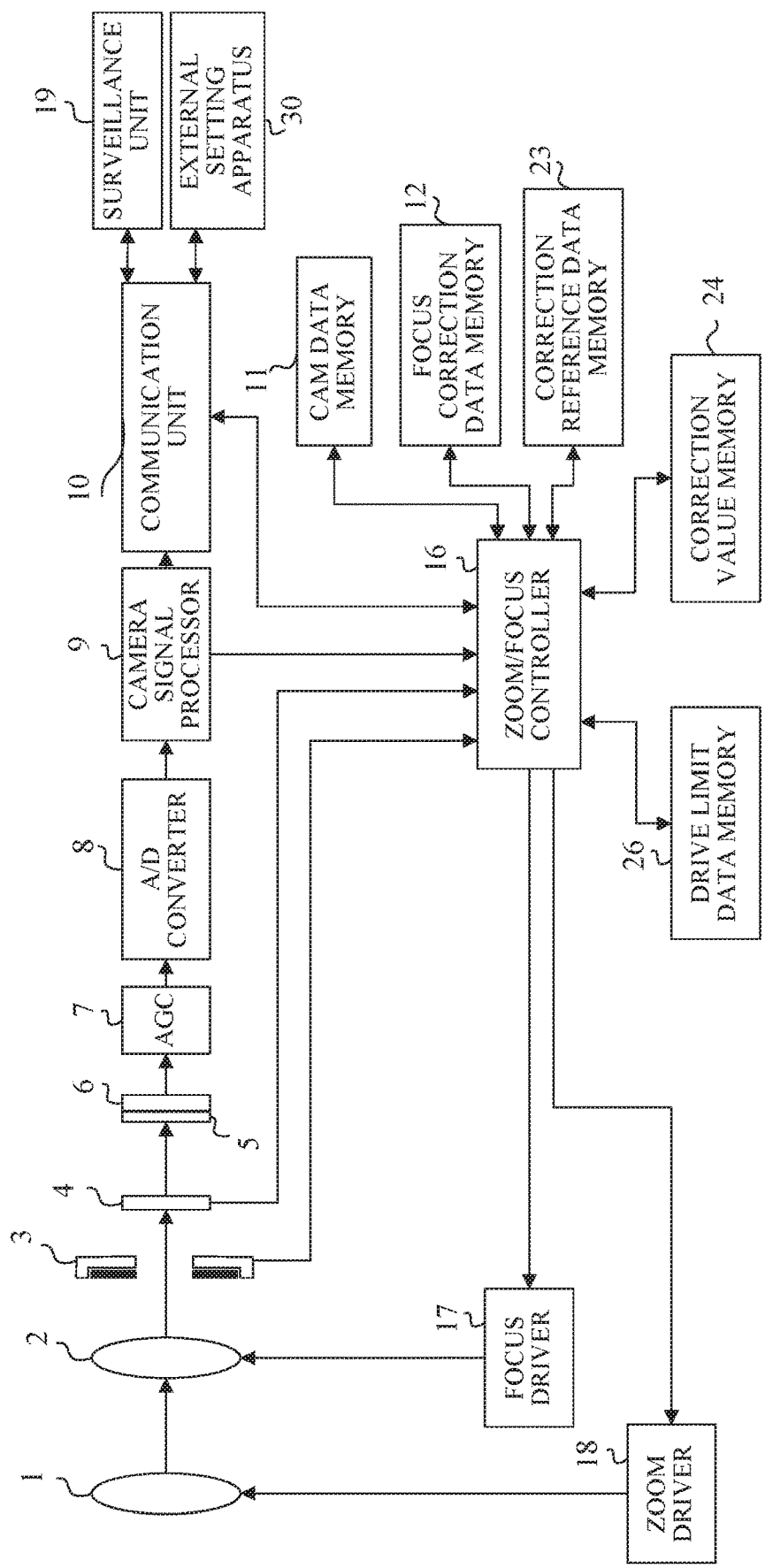
FIG. 13 is a block diagram of a configuration in an image capturing apparatus according to a fourth embodiment of the present invention.

FIG. 13 illustrates a configuration in an image capturing apparatus according to a fourth embodiment of the present invention. The image capturing apparatus according to this embodiment has the same configuration as that of the third embodiment, and those elements in this embodiment, which are corresponding elements in the third embodiment, will be designated by the same reference numerals.

The image capturing apparatus according to this embodiment is connected to a thermal correction setting unit 30 through a wired or wireless communication. The thermal correction setting unit 30 sends a thermal focus correction method selected by the user (thermal focus correction mode) to the zoom/focus controller 16 via the communication unit 10, and sets the selected thermal focus correction mode in the zoom/focus controller 16 (or the image capturing apparatus). The thermal correction setting unit 30 is an apparatus that enables a user to select the thermal focus correction mode and to set the zoom control, the AF control, etc. The thermal correction setting unit 30 may be contained in the surveillance monitor unit 19.

Figure 14:
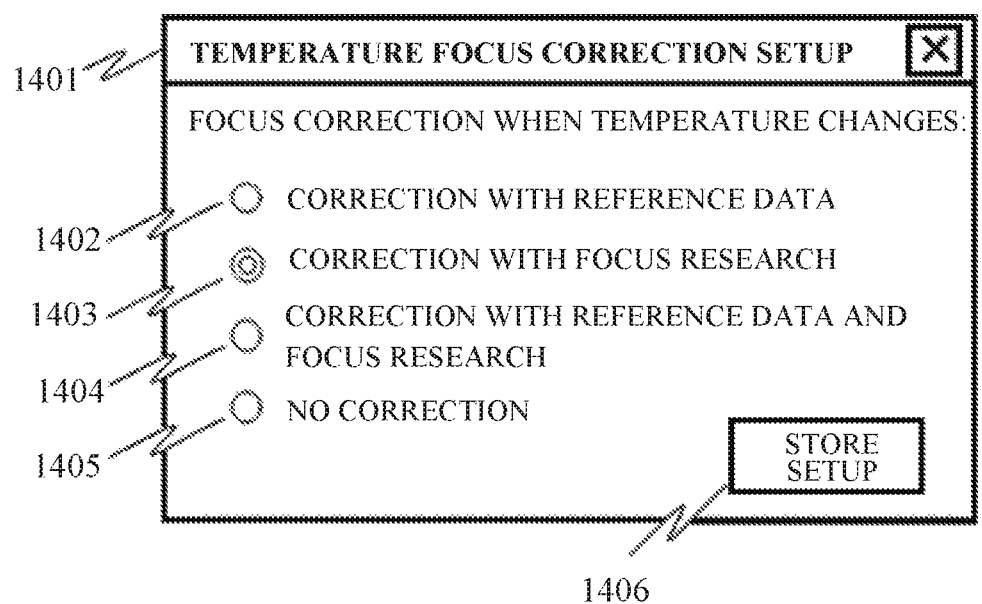
FIG. 14 illustrates a setup menu screen in a thermal focus correction mode according to a fourth embodiment.

FIG. 14 illustrates a setup menu screen example in the thermal focus correction mode displayed in the thermal correction setting unit 30. A plurality of thermal focus correction modes (focus corrections when the temperature changes) may be selected on a setup menu screen (selector) 1401. In this embodiment, four selections are available as a plurality of thermal focus correction modes (a plurality of types of thermal focus corrections), such as a "correction with reference data" 1402, a "correction with a focus search" 1403, a "correction with reference data and focus search" 1404, and "no correction" 1405.

When the "correction with the reference data" is selected, the zoom/focus controller 16 performs the basic thermal focus correction (first thermal focus correction) described in the third embodiment. This correction mode is selected where the image capturing apparatus has little individual scattering or where the diaphragm has always a small aperture state in the image capturing apparatus.

When the "correction with the focus search" is selected, the zoom/focus controller 16 performs the individual thermal focus correction (second thermal focus correction) described in the third embodiment. This correction mode is selected where the image capturing apparatus has lots of individual scattering or where the diaphragm has always an open state in the image capturing apparatus.

When the "correction with the reference data and focus search" is selected, the zoom/focus controller 16 performs a thermal focus correction (third thermal focus correction) that contains the basis thermal focus correction and the individual thermal focus correction.

In this correction mode, the thermal defocus is more restrained when the individual thermal focus correction is performed than when the "correction with the focus search" is selected, because of the basic thermal focus correction. Therefore, the search range of the individual thermal focus correction may be narrowed. This configuration can restrain the object replacement and properly correct the thermal defocus. Alternatively, the thermal change amount for the individual thermal focus correction may be increased. This configuration can reduce the number of individual thermal focus corrections, restrain the object replacement, and improve the durability.

When "no correction" is selected, the zoom/focus controller 16 does not perform the basic thermal focus correction or the individual thermal focus correction. This correction mode is selected when the diaphragm is always open or the thermal defocus is negligible in the image capturing apparatus and the durability of the focus driving is considered in the image capturing apparatus.

The user selects the thermal focus correction mode, and presses the setting button ("store setting" 1406. Thereby, the thermal focus correction mode is determined, and the information in the set thermal focus correction mode is sent to the zoom/focus controller 16. The zoom/focus controller 16 executes the thermal focus correction in accordance with the received thermal focus correction mode. When the "correction with the reference data and focus search" is selected, all steps described in FIG. 12 are executed, and when another correction mode is selected, unnecessary steps are skipped.

Figure 15:
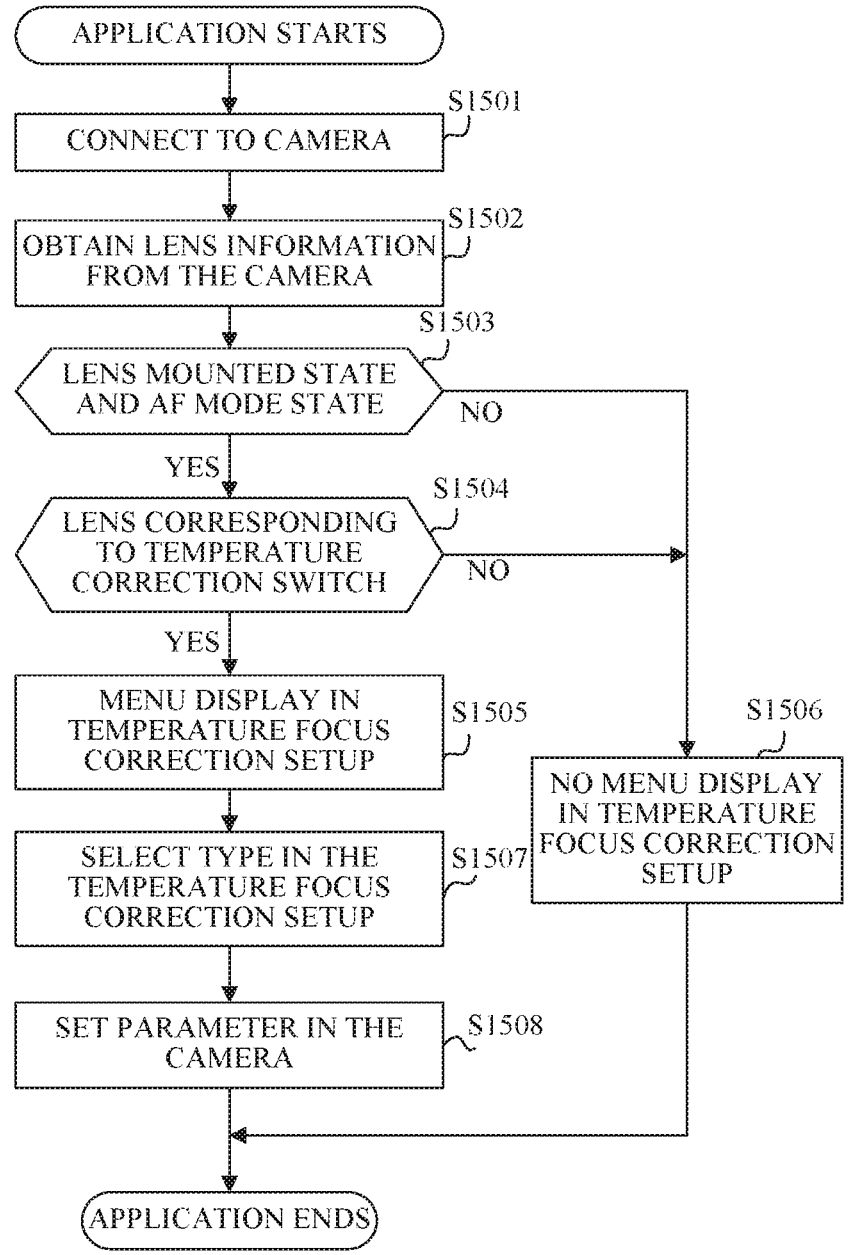
FIG. 15 is a flowchart for a thermal focus correction mode setting process according to the fourth embodiment.

A flowchart in FIG. 15 illustrates a flow of a process of the thermal correction setting unit 30 for setting the thermal focus correction mode in the image capturing apparatus. The thermal correction setting unit 30 that includes the computer (setting unit) executes this process in accordance with a temperature correction setting program as a computer program.

In the step S1501, a connection (communication) is established with the image capturing apparatus (referred to as a "camera" hereinafter). In the step S1502, the thermal correction setting unit 30 obtains lens information from the camera. The lens information contains information on whether the interchangeable lens as the lens barrel is attached to the camera, and information on the setup of the MF mode/AF mode in the focus switch which will be described later and is attached to the camera or the interchangeable lens. In the following description, the lens barrel is an interchangeable lens.

Figure 16:
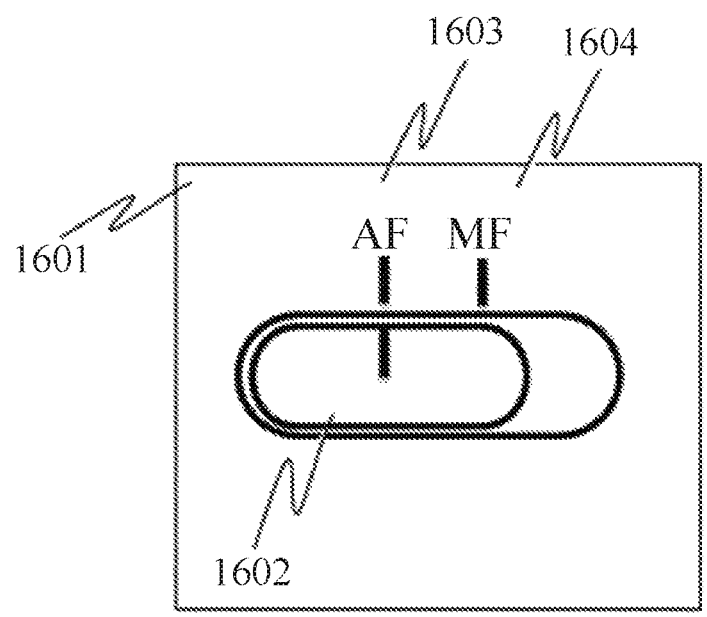
FIG. 16 illustrates a focus mode switch according to the fourth embodiment.

FIG. 16 illustrates a focus mode switch 1601. Reference numeral 1602 denotes an operating unit for setting the AF mode or the MF mode. When the operating unit indicates "AF" 1603, the camera operates in the AF mode, and when the operating unit indicates "MF" 1604, the camera operates in the MF mode.

Next, in the step S1203, the thermal correction setting unit 30 determines, based on the lens information obtained from the camera, whether or not the interchangeable lens is attached to the camera or whether or not the focus switch is set to the MF mode. When the interchangeable lens is not attached to the camera or when the focus mode switch is set to the AF mode, the thermal correction setting unit 30 proceeds to the step S1506. In the step S1506, the thermal correction setting unit 30 hides the menu screen for the thermal focus correction mode (or makes a setup that does not perform the thermal focus correction) and ends this process.

When the AF mode is set, the AF control is restarted as the object changes and the AF control for the thermal correction becomes basically unnecessary. Since the thermal focus correction may be necessary even in the AF mode depending on the lens type, it is unnecessary to limit the thermal focus correction to the MF mode. In the camera or interchangeable lens that uses the MF mode for a mode that fixes the focus position, the thermal focus correction can be executed only in the AF mode and thus the thermal focus correction may be performed only in the AF mode.

In the step S1503, when the interchangeable lens is attached to the camera and the focus mode switch is set to the MF mode, the thermal correction setting unit 30 proceeds to the step S1504. In the step S1504, the thermal correction setting unit 30 determines whether the interchangeable lens is compatible with a switch of the thermal focus correction mode. For example, information of whether the interchangeable lens is compatible with the switch of the thermal focus correction mode is received from the interchangeable lens, and that is determined based on the information. The information of whether the interchangeable lens is compatible with the switch of the thermal focus correction mode is, for example, lens ID (identification information) obtained from the interchangeable lens and the thermal correction setting unit 30 may determine, based on the lens ID, whether the interchangeable lens is compatible with the switch of the thermal focus correction mode. In addition, as information on whether the interchangeable lens is compatible with the switch of the thermal focus correction mode, information on the function of the interchangeable lens and information on whether the interchangeable lens is compatible with the switch of the thermal focus correction mode are received from the interchangeable lens and used for the determination. When the interchangeable lens is not compatible with the switch of the thermal focus correction mode, the thermal correction setting unit 30 proceeds to the step S1506 and ends this process. On the other hand, when the interchangeable lens is compatible with the switch of the thermal focus correction mode, the thermal correction setting unit 30 proceeds to the step S1505 and the menu screen used to set the thermal focus correction mode is displayed.

When the interchangeable lens is not compatible only with part (at least one) of the four thermal focus correction modes, the display unit may hide or display the non-selection of the incompatible item.

In the step S1507, when the user selects or finalizes the thermal focus correction mode, the thermal correction setting unit 30 sends the finalized thermal focus correction mode to and sets the finalized thermal focus correction mode to the zoom/focus controller 16. The zoom/focus controller 16 executes the thermal focus correction in accordance with the set thermal focus correction mode. This configuration can provide an optimal thermal focus correction in accordance with the set environment and the camera settings where the defocus occurs as the temperature changes in the interchangeable lens.

Fifth Embodiment

This embodiment relates to an AF control that corrects defocus caused by the temperature similar to the third embodiment, improve the accuracy of the individual thermal focus correction, and reduces the in-focus time.

The configuration of the image capturing apparatus according to the fifth embodiment is similar to that of the third embodiment, and a description thereof will be omitted.

The individual thermal focus correction according to the third embodiment may set the AF drive starting direction to the known direction, but may start the AF drive from a more preferable direction when the correcting direction can be estimated and the highly accurate AF control is available in a short time. The correcting direction according to this embodiment is a direction of the in-focus position when the AF control start position for the focus lens is set to the starting position.

This embodiment uses as the AF control method a wobbling method that wobbles the focus lens and drives it in a contrast increasing direction, and a scanning method that drives the focus lens from one end to the other end in the search range and stops the focus lens at the maximum contrast position.

FIGS. 17A to 17D illustrate the AF control when the focus lens is driven in a direction opposite to the correcting direction and when the focus lens is driven in the correcting direction. FIGS. 17A and 17B illustrate wobbling methods and FIGS. 17C and 17C illustrate scanning methods. P1 represents an AF control starting position, and P2 represents an in-focus position.

In the wobbling method, when the AF drive starts in a direction opposite to the correcting direction as illustrated in FIG. 17A, the reverse operation occurs. Hence, the focus lens is driven to the in-focus position, and it takes time to finish the AF control. On the other hand, when the AF drive starts in the correcting direction as illustrated in FIG. 17B, the reverse rotation does not occur and the AF control can be shorter than that in FIG. 17A.

In the scanning method, when the AF drive starts in the correcting direction as illustrated in FIG. 17C, and it is necessary to drive the focus lens from the scanning end position (corresponding to the near limit) to the in-focus position after the scanning ends and it takes time to finish the AF control for this driving. As the in-focus driving distance is longer, the stop error is likely to occur depending on the lens driving characteristic. On the other hand, when the AF drive starts in a direction opposite to the correcting direction as illustrated in FIG. 17D, the distance from the scanning end position to the in-focus position can be shortened and thus the in-focus time period can be shorter. Since the stop error reduces, more accurate AF driving is available. In addition, since a total drive amount can be restrained, the durability improves.

As described above, a drive starting direction of the focus lens is different between the wobbling method and the scanning method with respect to the correcting direction. Accordingly, the zoom/focus controller 16 in this embodiment controls the drive starting direction of the focus lens according to the AF control methods.

Figure 18A:
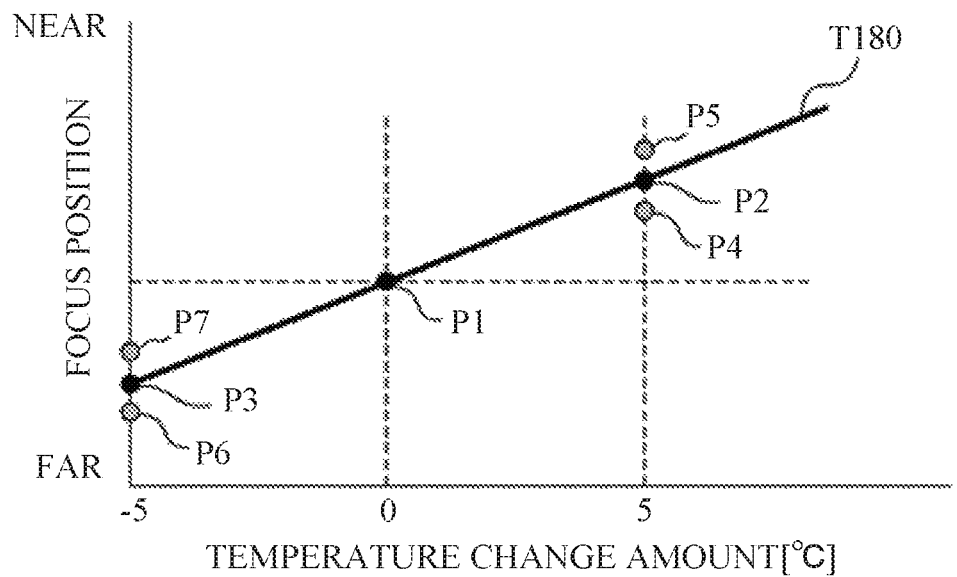
FIGS. 18A and 18B explain a method for estimating the correcting direction in the individual thermal focus correction.
Figure 18B:
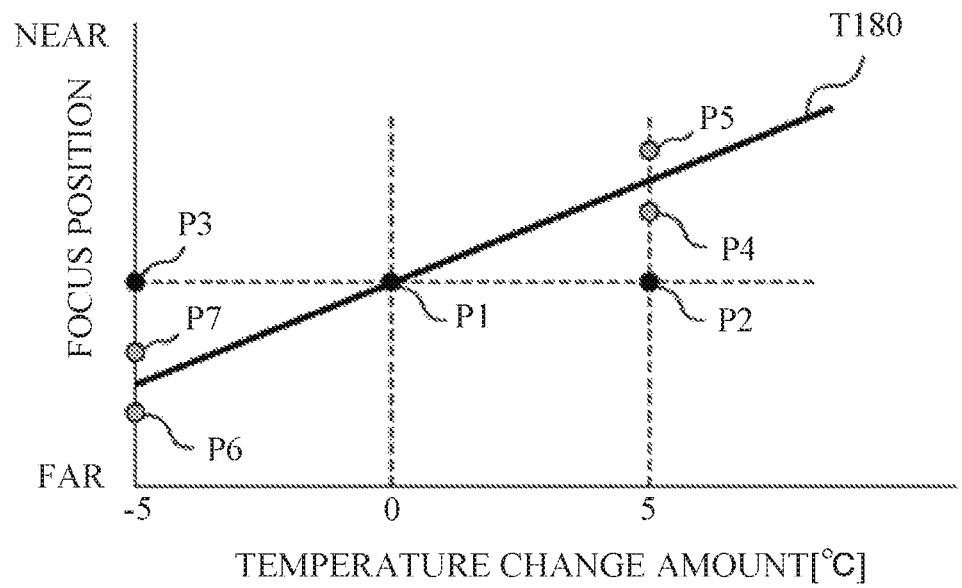

FIGS. 18A and 18B explain a method for estimating the correcting direction in the individual thermal focus correction. The abscissa axis denotes a thermal change amount (° C.), the ordinate axis denotes a focus position, and T180 represents a focus correction amount in the basic thermal focus correction. P1 represents a focus position corresponding to a focus position fixed by the user, and the temperature at this time is set to the reference temperature. P2 and P3 represent focus positions when the temperature changes by +5° C. and −5° C. from the reference temperature and the individual thermal focus correction starts. P4 and P5 represent illustrative actual in-focus positions when the temperature changes by +5° C. from the reference temperature, and P6 and P7 represent illustrative actual in-focus positions when the temperature changes by −5° C. from the reference temperature. FIG. 18A illustrates that the basic thermal focus correction is performed, and FIG. 18B illustrates that the basic thermal focus correction is not performed.

In FIG. 18A, P2 and P3 have moved to the focus positions along T180 since the basic thermal focus correction is performed. The thermal defocus is restrained to a minimum, a direction from P2 to P4 is not the same as that from P2 to P5 and a direction from P3 to P6 is not the same as that from P3 to P7, and the correcting direction cannot be estimated in the individual thermal focus correction.

In FIG. 18B, P2 and P3 have not moved from P1 since no basic thermal focus correction is performed. The thermal defocus occurs, a direction from P2 to P4 is the same as that from P2 to P5. In addition, a direction from P3 to P6 is the same as that from P3 to P7. In other words, the in-focus positions are located on the same sides from the actual focus positions. The correcting direction in the individual thermal focus correction can be estimated based on this characteristic.

Accordingly, this embodiment estimates the correcting direction for the individual thermal focus correction when the basic thermal focus correction is not performed.

Figure 19:
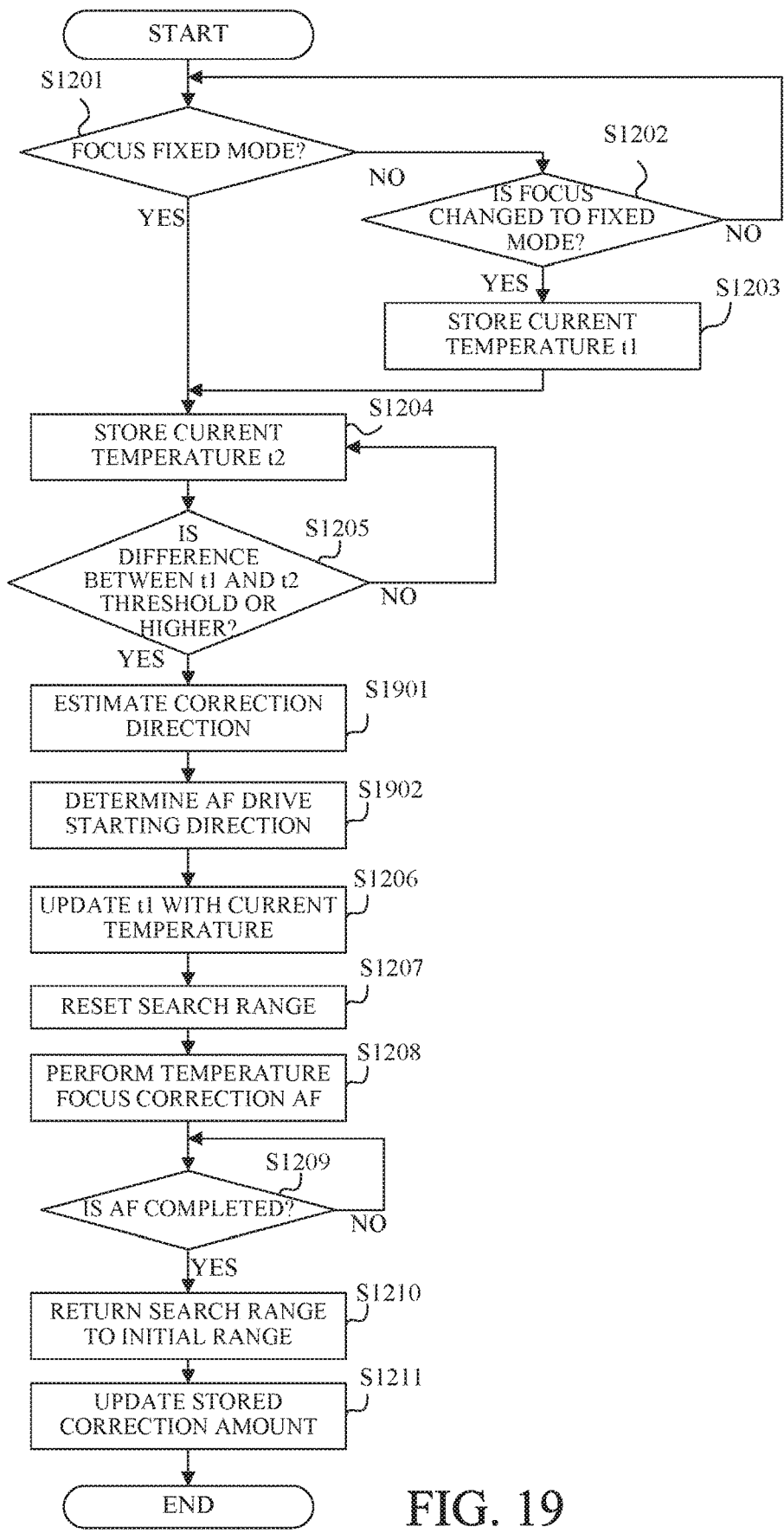
FIG. 19 is a flowchart for a focus control process according to the fourth embodiment.

Referring now to a flowchart in FIG. 19, a description will be given of a process of this embodiment. Those steps in FIG. 19, which are corresponding steps in FIG. 12 according to the third embodiment, will be designated by the same reference numerals, and a description thereof will be omitted.

When a thermal change amount is equal to or larger than the predetermined value in the step S1205, the zoom/focus controller 16 estimates the correcting direction in the step S1901. The correcting direction can be estimated based on the code (thermal changing direction) of the difference between the temperature t1 and the temperature t2 and the reference focus correction amount stored in the correction reference data memory 23.

An illustrative estimation method of the correcting direction will be described. As described with reference to FIG. 18B, the in-focus positions are located on the same side of the actual focus positions P3. More specifically, when the thermal changing direction is a decreasing direction (where the difference between the temperature t1 and the temperature t2 has a minus code, the thermal defocus occurs so that the in-focus position is located on the far (infinity) side of the current focus position. On the other hand, when the thermal changing direction is an increasing direction (where the difference between the temperature t1 and the temperature t2 is a plus code, the thermal defocus occurs so that the in-focus position is located on the near (short distance) side of the current focus position. Accordingly, the zoom/focus controller 16 in this embodiment determines that the correcting direction is located on the infinity side when the thermal changing direction is the decreasing direction. In addition, the zoom/focus controller 16 determines that the correcting direction is located on the short distance side when the thermal changing direction is the increasing direction.

Next, in the step S1902, the drive starting direction of the thermal focus correction AF executed in the step S1208 is determined based on the correcting direction estimated in the step S1901. The drive starting direction is determined so as to correspond to the AF control method as described with reference to FIGS. 17A to 17D. In other words, when the AF control method is determined to be the wobbling method, the zoom/focus controller 16 provides such a control that the focus lens is moved in the correcting direction. When the AF control method is determined to be the scanning method, the zoom/focus controller 16 provides such a control that the focus lens is moved in the direction opposite to the correcting direction. Subsequent to the step S1901, the flow follows the same steps in FIG. 12 according to the third embodiment and the process ends. The search range set in the step S1207 may be changed according to the estimated correcting directions. In other words, when the correcting direction is located on the infinity side, the search range is made longer in the infinity direction and shorter in the short distance direction. When the correcting direction is located on the short distance side, the search range is made shorter in the infinity direction and longer in the short distance direction.

As described above, where the individual thermal focus correction is performed without the basic thermal focus correction, this embodiment estimates the correcting direction, drives the AF driving direction based on this estimation, and drives the focus lens. This configuration improves the accuracy of the individual thermal focus correction, and shortens the in-focus time. This embodiment is useful when the thermal correction setup according to the fourth embodiment is the "correction with the focus search."

Whether or not this embodiment is used may be determined based on the thermal correction setup. More specifically, this embodiment is used when the "correction with the focus search" is selected, and this embodiment is not used when the "correction with the reference data and focus search" is selected.

While this embodiment discusses no basic thermal focus correction is performed, a weak basic thermal focus correction may be performed. Thus, when the basic thermal focus correction and the individual thermal focus correction are compatible, the correction direction can be estimated based on the code (thermal changing direction) of the difference between the temperature t1 and the temperature t2, and the reference focus correction amount stored in the correction reference data memory 23. As the basic thermal focus correction is made weaker, the estimation of the correcting direction in the individual thermal focus correction becomes more reliable. At this time, the thermal defocus and the reliability of the correcting direction have a trade-off relationship, but the thermal defocus can be maintained in a permissible range and the estimation reliability of the correcting direction can be improved by reducing the thermal changing amount for the individual thermal focus correction, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent configurations and functions.

This application claims the benefit of Japanese Patent Applications Nos. 2017-017176, filed on Feb. 2, 2017, and 2017-063733, filed on Mar. 28, 2017, each of which is hereby incorporated by reference herein in its entirety.

What is claimed is:

1. An image capturing apparatus comprising:
   an image sensor configured to output a signal corresponding to an object image formed by an image capturing optical system; and
   at least one processor which executes a program stored in a memory, wherein the at least one processor functions as;
   a controller configured to provide a focus control that holds an object distance on which an image capturing optical system is focused that includes a magnification varying lens and a focus lens, and
   a calculator configured to calculate a defocus amount by using information on lens sensitivity that represents a relationship between a unit moving amount of the magnification varying lens and a moving amount of an image plane in the image capturing optical system, and information on error amounts of stop positions of the magnification varying lens and that of the focus lens,
   wherein the controller moves the focus lens in a moving range limited based on the defocus amount.

2. The image capturing apparatus according to claim 1, wherein the error amounts of the stop positions are obtained based on an engagement gap amount between a lens holder configured to hold a corresponding one of the magnification varying lens and the focus lens, and a guide member engaged with the lens holder and configured to guide a movement of the lens holder.

3. The image capturing apparatus according to claim 1, wherein the controller provides the focus control in a mode that fixes the object distance to be focused.

4. The image capturing apparatus according to claim 1, wherein the controller provides the focus control in a mode that fixes a zoom magnification in the image capturing optical system and the object distance to be focused.

5. The image capturing apparatus according to claim 1, wherein the controller provides the focus control when the image capturing optical system is panned, tilted, or zoomed.

6. The image capturing apparatus according to claim 1, wherein the controller provides a zoom tracking control for moving the focus lens so as to reduce a movement of the image plane along with a movement of the magnification varying lens, and provides the focus control with the zoom tracking control.

7. The image capturing apparatus according to claim 1, wherein the controller provides the focus control when a focus control apparatus of the image capturing apparatus is restarted.

8. The image capturing apparatus according to claim 1, wherein the controller does not provide the focus control when the defocus amount does not exceed a depth of field of the image capturing optical system.

9. The image capturing apparatus according to claim 1, wherein the controller provides the focus control by using an image signal generated through an image sensor configured to photoelectrically convert an object image formed by the image capturing optical system.

10. A focus control apparatus comprising:
    a temperature detector configured to detect a temperature of an image optical system, and
    at least one processor which executes a program stored in a memory, wherein the at least one processor functions as;
    a controller configured to provide a focus control that holds an object distance on which the image capturing optical system is focused that includes a focus lens;
    wherein the controller moves the focus lens in a moving range limited based on a change amount of the temperature in the focus control when the change amount of the temperature from reference temperature is higher than a predetermined thermal change amount.

11. The focus control apparatus according to claim 10, further wherein the at least one processor further functions as a determiner configured to determine whether the temperature is likely to rise or drop from reference temperature based on the change amount of the temperature,
    wherein the controller determines a driving direction of the focus lens based on a determination result by the determiner.

12. The focus control apparatus according to claim 11, wherein the controller changes the moving range of the focus lens based on the driving direction.

13. The focus control apparatus according to claim 10, wherein the controller provides a first focus position correction that moves the focus lens in a direction for holding the object distance to be focused without the focus control in accordance with the change amount of the temperature, and a second focus position control that moves the focus lens through the focus control in the moving range that contains a position of the focus lens moved by the first focus position control.

14. The focus control apparatus according to claim 13, wherein the controller limits the moving range with a moving limit position set for the position of the focus lens moved by the first focus position correction.

15. The focus control apparatus according to claim 14, wherein the image capturing optical system includes a magnification varying lens, and
wherein the controller changes the moving limit position in accordance with at least one of a position of the magnification varying lens and the object distance to be focused.

16. The focus control apparatus according to claim 13, wherein the image capturing optical system includes a magnification varying lens,
wherein the controller provides a zoom tracking control that moves the focus lens in accordance with cam data so as to reduce a movement of an image plane along with a movement of the magnification varying lens, and
wherein the controller provides the zoom tracking control with the cam data based on the movement of the focus lens by the first focus position correction and the second focus position correction, when the change amount of the temperature is larger than the predetermined thermal change amount.

17. The focus control apparatus according to claim 16, wherein the controller changes the predetermined thermal change amount in accordance with a slope of the cam data.

18. The focus control apparatus according to claim 10, wherein the controller provides the focus control in a mode that fixes the object distance to be focused.

19. The focus control apparatus according to claim 10, wherein the controller changes the predetermined thermal change amount in accordance with at least one of a change ratio of the temperature, a tilt angle of the image capturing optical system, and an accumulated lens driving number in the image capturing optical system.

20. The focus control apparatus according to claim 10, wherein the image capturing optical system is configured to change a zoom magnification, and wherein the controller does not provide the focus control at least one of when the zoom magnification is smaller than a predetermined zoom magnification and when an F-number in the image capturing optical system is larger than a predetermined F-number.

21. The focus control apparatus according to claim 10, wherein the controller provides the focus control by using an image signal generated through an images sensor configured to photoelectrically convert an object image formed by the image capturing optical system.

22. The focus control apparatus according to claim 21, wherein the controller does not provide the focus control at least one of when a gain of the image sensor is higher than a predetermined level and when a contrast evaluation value obtained from the image signal is lower than a predetermined evaluation value.

23. An image capturing apparatus comprising:
an image sensor configured to output a signal corresponding to an object image formed by an image capturing optical system; and
a focus control apparatus that includes;
a temperature detector configures to detect a temperature of the image capturing optical system; and
at least one processor which executes a program stored in a memory, wherein the at least one processor functions as;
a controller configured to provide a focus control that holds an object distance on which an image capturing optical system is focused that includes a focus lens,
wherein the controller moves the focus lens in a moving range limited based on a change amount of the temperature in the focus control when the change amount of the temperature from reference temperature is higher than a predetermined thermal change amount.

24. A focus control method comprising the steps of:
providing a focus control that holds an object distance on which an image capturing optical system is focused that includes a focus lens; and
detecting a temperature of the image capturing optical system,
wherein the focus control moves the focus lens in a moving range limited based on a change amount of the temperature in the focus control when the change amount of the temperature from reference temperature is higher than a predetermined thermal change amount.

25. A focus control apparatus comprising at least one processor which executes a program stored in a memory, wherein the at least one processor functions as;
a controller configured to control a focus lens so as to hold an object distance on which an image capturing optical system is focused, and controls the focus lens based on one of a plurality of focus position correction modes that correct a focus position in accordance with a change of a temperature, and
wherein the focus position correction modes include a first focus position correction mode that moves the focus lens in a holding direction of the object distance without performing the focus control in accordance with a change amount of the temperature, a second focus position correction mode that moves the focus lens by the focus control in a moving range that contains a position of the focus lens moved by the first thermal focus correction, in accordance with the change amount of the temperature, and a third focus position correction mode that contains the first focus position correction mode and the second focus position correction mode in accordance with the change amount of the temperature, and
wherein the controller controls the focus lens based on one of the first focus position correction mode, the second focus position correction mode, and the third focus position correction mode, selected by a user.

26. The focus control apparatus according to claim 25, wherein a lens apparatus is attached to and detached from the focus control apparatus, and
wherein the controller determines whether the lens apparatus is compatible with the first focus position correction mode, the second focus position correction mode, and the third focus position correction mode, in accordance with information on the lens apparatus, and the controller controls the focus lens so as to correct the focus position based on the one selected by a user when determining that the lens apparatus is compatible.

27. The focus control apparatus according to claim 26, further comprising a display unit configured to display a plurality of correction modes relating to the focus correction based on the change of the temperature, and the at least one processor further functions as:

a correction mode setting unit connected to the controller, and configured to communicate with the controller and to provide at least one type of thermal focus correction that moves the focus lens as the temperature changes;

a selector configured to enable the user to select the thermal focus correction that sends information on the correction mode selected on the display unit by the user to the controller; and a setter configured to set a selected thermal focus correction in the controller.

28. The focus control apparatus according to claim 26, wherein the memory is configured to further store information on error amounts of stop positions of the magnification varying lens and the focus lens, in accordance with a type of a lens apparatus, and wherein the controller calculates a defocus amount based on information on the error amounts of the stop positions of the magnification varying lens and the focus lens corresponding to the type of the lens apparatus that is attached.

29. A focus control method comprising the steps of:

providing a focus control that holds an object distance on which an image capturing optical system is focused that includes a magnification varying lens and a focus lens, and calculating a defocus amount by using information on lens sensitivity that represents a relationship between a unit moving amount of the magnification varying lens and a moving amount of an image plane in the image capturing optical system, and information on error amounts of stop positions of the magnification varying lens and that of the focus lens, wherein the focus control moves the focus lens in a moving range limited based on the defocus amount.

* * * * *